US008717847B2

(12) United States Patent
Blake

(10) Patent No.: US 8,717,847 B2
(45) Date of Patent: May 6, 2014

(54) SONAR APPARATUS

(75) Inventor: Colin Desmond Blake, Ringwood (GB)

(73) Assignee: Echopilot Marine Electronics Limited, Ringwood, Hampshire (GB)

( * ) Notice: Subject to any disclaimer, the term of this patent is extended or adjusted under 35 U.S.C. 154(b) by 146 days.

(21) Appl. No.: 13/421,215

(22) Filed: Mar. 15, 2012

(65) Prior Publication Data

US 2013/0242700 A1 Sep. 19, 2013

(51) Int. Cl.
*G01S 15/89* (2006.01)

(52) U.S. Cl.
USPC .................................................. 367/88

(58) Field of Classification Search
USPC .................................................. 367/88
See application file for complete search history.

(56) References Cited

U.S. PATENT DOCUMENTS

| 3,392,392 | A | 7/1968 | Magnuski |
| 3,618,007 | A | 11/1971 | Anderson |
| 3,633,205 | A | 1/1972 | Lee |
| 4,333,170 | A | 6/1982 | Mathews |
| 4,988,996 | A | 1/1991 | Ito |
| 5,070,484 | A | 12/1991 | Mantel |
| 5,318,033 | A | 6/1994 | Savord |
| 5,530,680 | A | 6/1996 | Whitehurst |
| 5,646,907 | A | 7/1997 | Maccabee |
| 6,573,855 | B1 | 6/2003 | Hayakawa et al. |
| 7,035,166 | B2 | 4/2006 | Zimmerman |
| 2003/0235112 | A1 | 12/2003 | Zimmerman |
| 2005/0007880 | A1 | 1/2005 | Zimmerman |
| 2005/0007881 | A1 | 1/2005 | Zimmerman |
| 2005/0099887 | A1 | 5/2005 | Zimmerman |
| 2005/0101867 | A1 | 5/2005 | Johnson |
| 2007/0025183 | A1* | 2/2007 | Zimmerman et al. .......... 367/88 |
| 2013/0242700 | A1* | 9/2013 | Blake .............................. 367/88 |

FOREIGN PATENT DOCUMENTS

| AU | 2002345848 A8 | 1/2003 |
| EP | 0116777 | 8/1984 |
| EP | 0860711 | 8/1998 |
| EP | 0624253 B1 | 5/1999 |
| GB | 2096854 | 10/1982 |
| GB | 2108666 | 5/1983 |
| GB | 2140558 A | 11/1984 |
| GB | 2197952 | 6/1988 |

(Continued)

OTHER PUBLICATIONS

Cloet et al., "A Sideways-looking Towed Depth-measuring System," Journal of Navigation (1982), 35 : pp. 411-420.

(Continued)

*Primary Examiner* — Daniel Pihulic

(57) ABSTRACT

Sonar apparatus for the location and display of features on the underwater floor in front of a boat includes port and starboard transducer units each containing transducer arrays. A transducer interface and a visual processor process signals from the transducer arrays to generate image data for a display. The transducer arrays emit sound waves into non-overlapping segments of water, reflected by the underwater floor back to the transducer arrays, which convert them to electrical signals. The electrical signals are processed to calculate a three-dimensional position of each point on the underwater floor. The sonar apparatus performs interpolation using the three-dimensional positions of the reflecting points within the segments to calculate three-dimensional positions of points on the underwater floor between these segments. The three-dimensional positions of the points are then used to generate image data showing the underwater floor in front of the boat.

16 Claims, 35 Drawing Sheets

(56) References Cited

FOREIGN PATENT DOCUMENTS

| | | | | |
|---|---|---|---|---|
| GB | 2500246 | * | 9/2013 | ............ G01S 15/87 |
| WO | 8100496 | | 2/1981 | |
| WO | 9307506 | | 4/1993 | |
| WO | 0013037 | | 3/2000 | |
| WO | 03001231 | | 1/2003 | |
| WO | 2005047930 | | 5/2005 | |
| WO | 2011148274 | | 12/2011 | |
| WO | 2011148275 | | 12/2011 | |

OTHER PUBLICATIONS

Horiguchi et al., "A Digital Phase Delay Compensation Beam-Forming Scheme for Ultrasonic Imaging," Jpn. J. Appl. Phys. 27 (1988) Supplement 27-1 pp. 215-217.

Kinsler et al., "Fundamentals of Acoustics," John Wiley & Sons, third edition, ISBN 0-471-02933-5, 1982, pp. 397-399.

The Search Report by the UK Intellectual Property Office, mailed on Jul. 16, 2012, in the related UK Application No. GB1204621.5.

Johnson et al., "Coherent-array imaging using phased subarrays. Part I: basic principles," IEEE Transactions on Ultrasonics, Ferroelectrics, and Frequency Control, vol. 52, No. 1, Jan. 2005.

* cited by examiner

SONAR APPARATUS

FIELD OF THE INVENTION

The present invention relates to sonar apparatus for the location and display of features on the underwater floor in front of a boat.

BACKGROUND

Many different types of sonar apparatus are known for locating features that lie on the underwater floor in front of a boat and displaying those features to a user on a display.

The known types of sonar apparatus generally fall into three categories.

A first category comprises phased arrays, in which a multitude of receivers are connected to a processor via variable delay lines. The processor adjusts the delays on the delay lines until the signals from each receiver produced by sound waves that have been reflected from points on the underwater floor are in phase. By measuring the time delay on each delay line, the direction of arrival of the sound waves, and hence the direction of the reflecting feature on the underwater floor, can be determined. By transmitting sound waves in a wide arc in front of the boat and detecting the reflected sound waves using the phased array, the positions of features on the underwater floor in the arc in front of the boat can be determined and displayed. However, apparatus of this type suffer from the problem that the phased array occupies a large physical area, and therefore requires a large hole to be drilled in the bottom of the boat to fit the apparatus. Furthermore, apparatus of this type require a long time to gather sufficient data to produce a reasonable image of the underwater floor, as each point on the floor has to be considered individually. Alternatively, to reduce this time, a large amount of parallel processing is performed, but this increases the cost of the apparatus significantly. These problems preclude the use of such apparatus on small boats.

A second category of apparatus comprises apparatus which employ a "staring array" of transducers, which is fixed in one direction to transmit sound waves into and receive sound waves from a narrow segment of water directly in front of the boat (hence the name "staring array" as the array stares in one direction). Apparatus of this type detect the phase of the reflected sound waves by processing the signals generated by different pairs of the transducers in the array. These apparatus have the advantage of a small physical size, high reliability and low cost. However, they suffer from the problem that points on the underwater floor are only detected in a narrow segment of water so that a full display of the underwater floor in front of the boat cannot be provided to the user.

A third category of apparatus comprise apparatus which employ an array of transmitting and receiving transducers, and which physically rotate the array to scan a wide arc in front of the boat so as to transmit sound waves into, and receive reflected sound waves from, that arc. As with phased arrays, apparatus of this type enable features on the underwater floor in front of the boat to be located within a wide arc. However, apparatus of this type suffer from the problem that a mechanical mechanism is necessary to rotate the array of transducers, and this mechanical mechanism has a tendency to break due to the continued scan movement. Furthermore, accuracy is reduced because of losses and beam angle scattering due to acoustic coupling from the moving array to the water.

SUMMARY

The present invention has been made with the problems of the conventional sonar apparatus in mind.

According to the present invention there is provided sonar apparatus for mounting on a boat, the sonar apparatus comprising:

a plurality of receivers, each receiver being responsive to sound waves reflected from points on the underwater floor within a respective segment of water in front of the boat to produce electrical signals;

a feature locator operable to process the electrical signals from each respective receiver to calculate the positions of reflecting points on the underwater floor within the segment of water associated with the receiver;

an interpolator operable to calculate from the positions of the reflecting points within the segments calculated by the feature locator, positions of points on the underwater floor between the segments; and a display data generator operable to process the positions of the points to generate image data for display showing the underwater floor in front of the boat within the segments and between the segments.

The present invention also provides a method of locating points on an underwater floor in front of a boat and generating image data for display showing the underwater floor, the method comprising:

receiving sound waves reflected from points on the underwater floor within different respective segments of water in front of the boat and converting the received sound waves to electrical signals for each of the segments of water;

processing the electrical signals from each respective segment of water to calculate positions of reflecting points on the underwater floor within the segment of water;

determining from the calculated positions of the reflecting points within the segments, positions of points on the underwater floor between the segments; and processing the positions of the points to generate image data for display showing the underwater floor in front of the boat within the segments and between the segments.

As a result of these features, apparatus is provided which has a compact arrangement of sound wave receivers and which produces image data showing the underwater floor in a wide arc in front of the boat. Furthermore, reliability and accuracy are improved compared to known sonar apparatus because the receivers need not move. In addition, processing speed is increased and cost is reduced compared to known sonar apparatus because it is not necessary to provide receivers and process the signals therefrom for all angles in front of the boat, and instead interpolation processing is performed to calculate the positions of points in between non-overlapping segments of water from which the receivers receive reflected sound waves.

BRIEF DESCRIPTION OF THE DRAWINGS

Embodiments of the invention will now be described, by way of example only, with reference to the accompanying drawings, in which.

DETAILED DESCRIPTION OF EMBODIMENTS

Figure 1A:
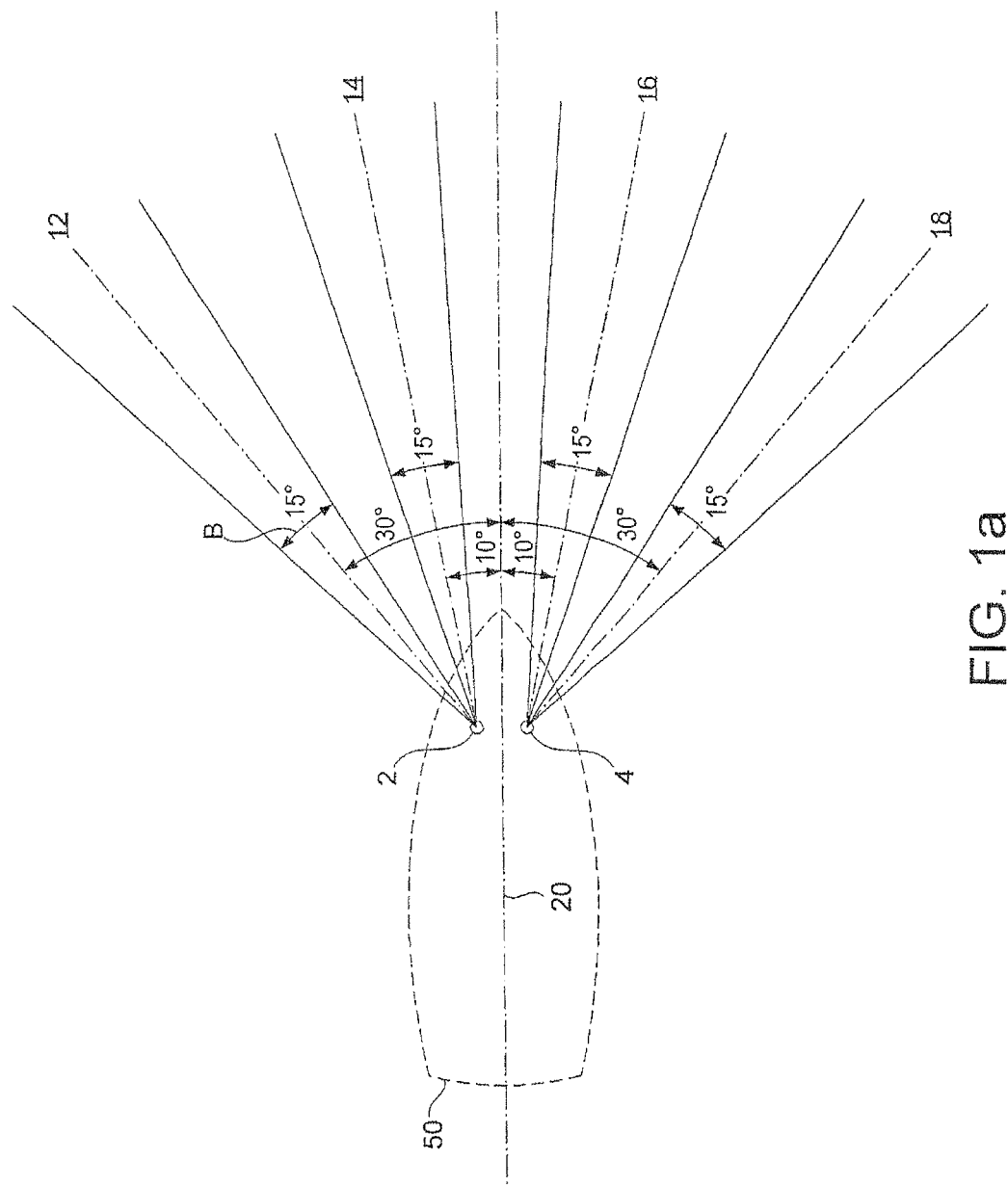
FIGS. 1a, 1b and 1c show a sonar apparatus of an embodiment mounted on a boat and further show the respective segments of water in front of the boat into which transducers in the sonar apparatus transmit sound waves and from which the transducers receive reflected sound waves from points on the underwater floor.
Figure 1B:
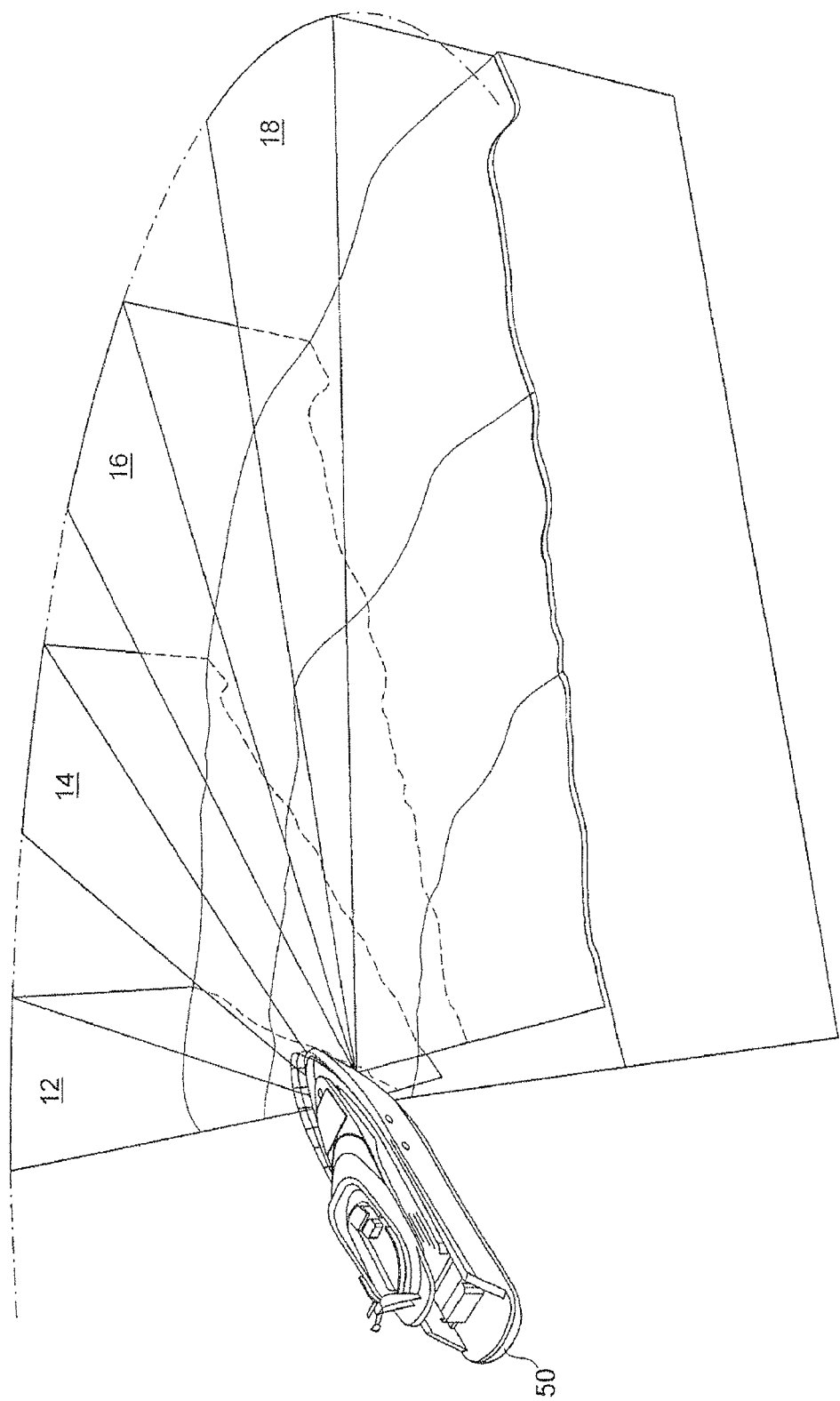
Figure 1C:
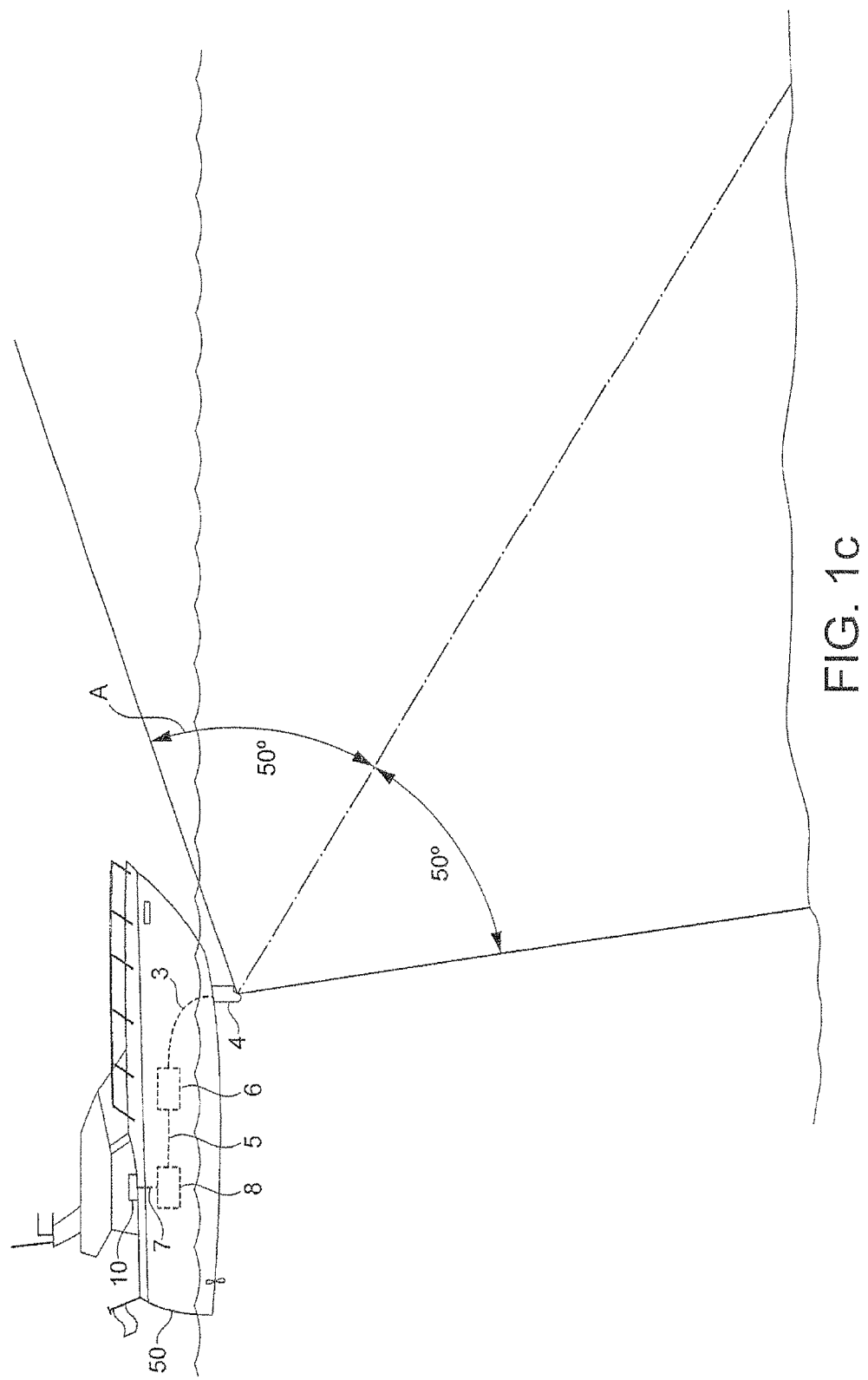

With reference to FIGS. 1a, 1b and 1c, the sonar apparatus of an embodiment is shown mounted on a boat 50. The sonar apparatus comprises a plurality of transducer units 2, 4 fitted through the hull on the underside of the boat 50. More particularly, in this embodiment, two transducer units are provided, namely a port transducer unit 2 mounted on the port side of the boat's hull and a starboard transducer unit 4 mounted on the starboard side of the boat's hull. As will be explained in further detail below, each transducer unit 2, 4 contains a plurality of transducer arrays (numbering two in the present embodiment, although other numbers of arrays could be included in each transducer unit).

The sonar apparatus further comprises a transducer interface 6 connected to the transducer units 2, 4 via cables 3, a visual processor 8 connected to the transducer interface 6 via cables 5 and a display 10 connected to the visual processor 8 via cables 7. The sonar apparatus also comprises a keypad (not shown in FIGS. 1a, 1b and 1c) to enable a user to input control instructions to the visual processor 8.

In operation, the visual processor 8 and the transducer interface 6 control each transducer array in turn within the transducer units 2, 4 to output a pulse of high frequency (for example 200 kHz), narrow bandwidth sound waves. The sound waves diverge in both the vertical and horizontal planes so that the sound waves are transmitted into a three-dimensional segment of water in front of the boat 50. In the vertical plane, the sound waves are transmitted in a broad arc A which extends both downwards below the hull of the boat 50 and forwards beyond the bow, as shown in FIG. 1c. More particularly, in this embodiment, each transducer array is constructed and arranged so that arc A extends to an angle of approximately ±50° about a line normal to the surface of the transmitting transducer array. The divergence of the sound waves in the horizontal plane is shown in FIGS. 1a and 1b. In this embodiment, the sound waves from each transducer array diverge in an arc B which extends approximately ±7.5° about a line normal to the surface of the transmitting transducer array.

As shown in FIGS. 1a and 1b, each transducer array is arranged at a different angle with respect to the centre line 20 of the boat 50 so as to transmit sound waves into a different segment 12, 14, 16, 18, of the water in front of the boat 50. More particularly, in this embodiment, the transducer arrays are arranged at angles of 10° and 30° to the centre line 20 on the port and starboard sides of the boat, respectively. As a result, the sonar apparatus of the present embodiment emits sound waves into four non-overlapping segments 12, 14, 16, 18, which are equally angularly spaced within an angular range of approximately ±37.5° of the centre line 20 in front of the boat 50. This angular range is referred to as the sonar's horizontal field of view. The equal angular spacing of the segments improves the accuracy of subsequently calculated interpolated points in between the segments 12, 14, 16, 18.

Within each respective segment of water 12, 14, 16, 18, the transmitted sound waves are incident on submerged features below and in front of the boat 50, which reflect the sound waves back to the transducer arrays, where they are received and converted to output electrical signals. The output signals are processed by the sonar apparatus, as will be described in detail below, to calculate the three-dimensional position of each point on the underwater floor within the water segments 12, 14, 16, 18 which reflected the sound waves. Furthermore, so as to provide data for points on the underwater floor, at all angles within the sonar's horizontal field of view (not just angles within the segments 12, 14, 16, 18), the sonar apparatus performs interpolation using the three-dimensional positions of the reflecting points within the segments 12, 14, 16, 18 to calculate three-dimensional positions of points on the underwater floor between these segments.

Figure 2:
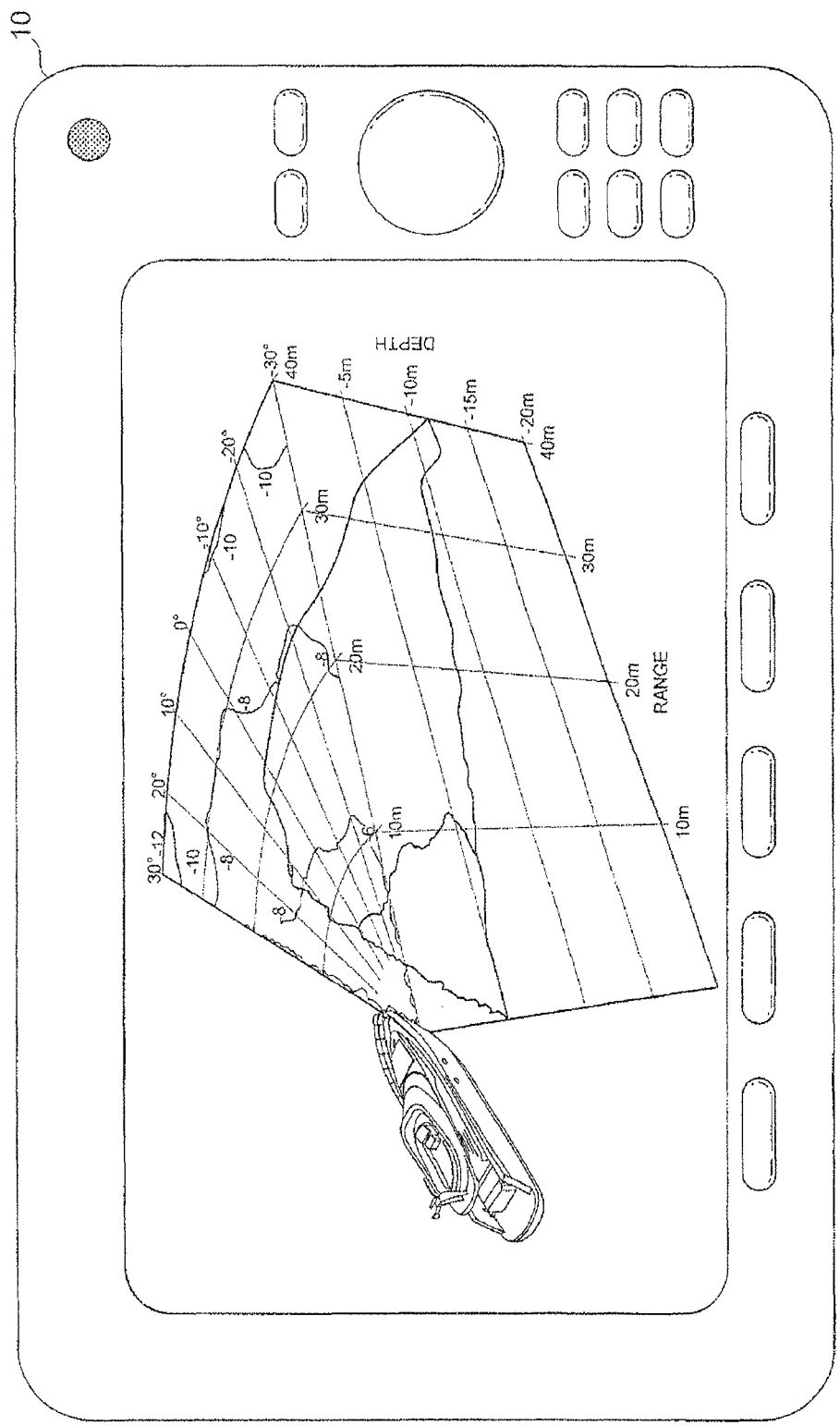
FIG. 2 is a view of the display device in the embodiment showing an example of how forward-looking three-dimensional data is displayed in the embodiment.

The sonar apparatus then processes the three-dimensional positions of the points to generate image data for display showing the underwater floor both within the segments 12, 14, 16, 18 and between these segments, so that the underwater floor can be seen for the whole of the sonar's horizontal field of view in front of the boat 50. An example of the image data when displayed on display 10 is shown in FIG. 2, from which it will be seen that the image data shows depth and distance data for the underwater floor in a three-dimensional segment extending across the sonar's horizontal field of view in front of the boat.

Having provided an overview of the operation of the sonar apparatus in the present embodiment, a detailed explanation will now be provided of the components within the sonar apparatus and the processing operations performed by those components.

Figure 3:
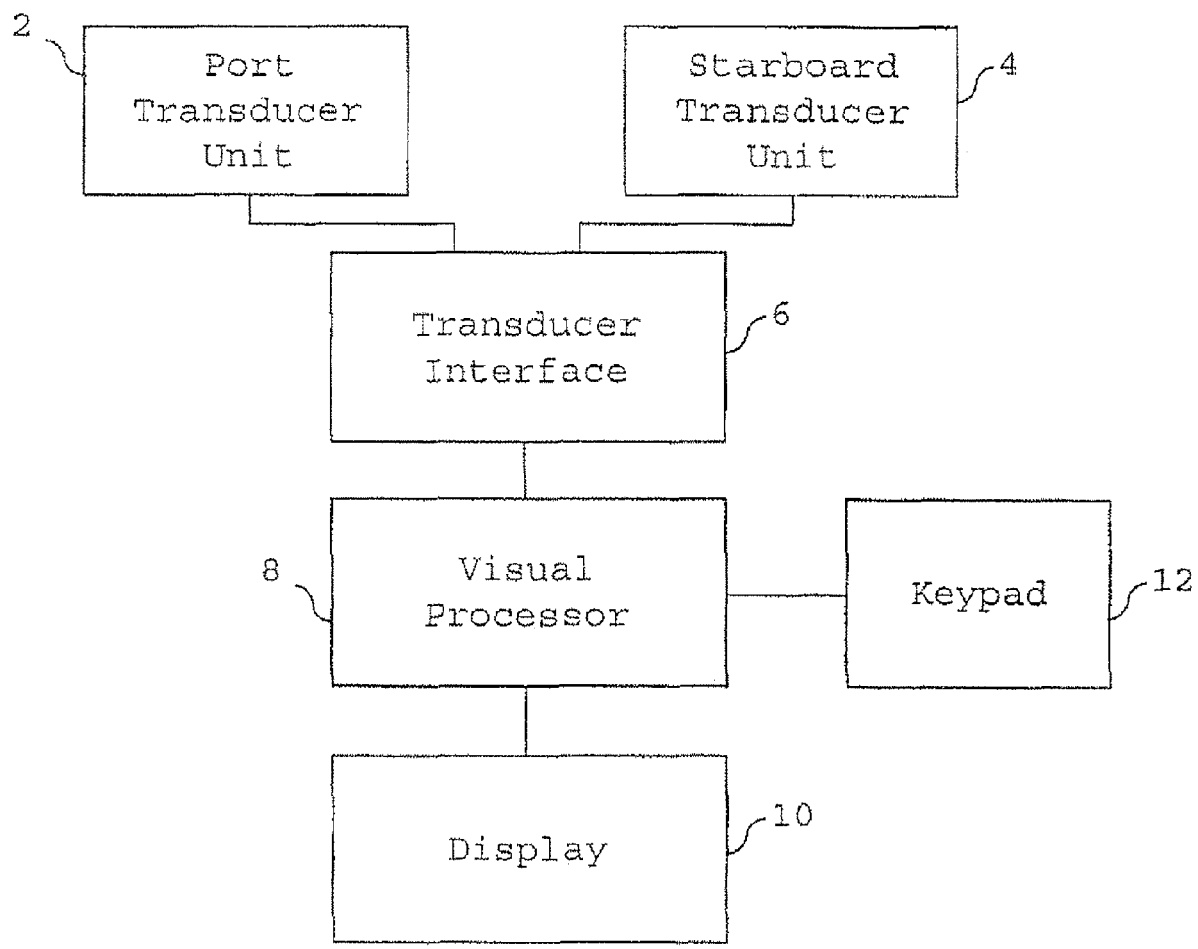
FIG. 3 is a schematic block diagram of the components of the sonar apparatus.

FIG. 3 shows a block diagram of the components of the sonar apparatus in the present embodiment. Each of the port and starboard transducer units 2, 4, as well as the transducer interface 6 and the visual processor 8 will be described in detail below. The display 10 in the present embodiment comprises the boat's chart plotter, although a dedicated display could be used instead. The keypad 12 comprises keys to enable the user to input configuration parameters and control instructions, for example to change the operating range of the sonar apparatus and/or the viewing direction from which the image of the underwater floor on display 10 is displayed.

Figure 4A:
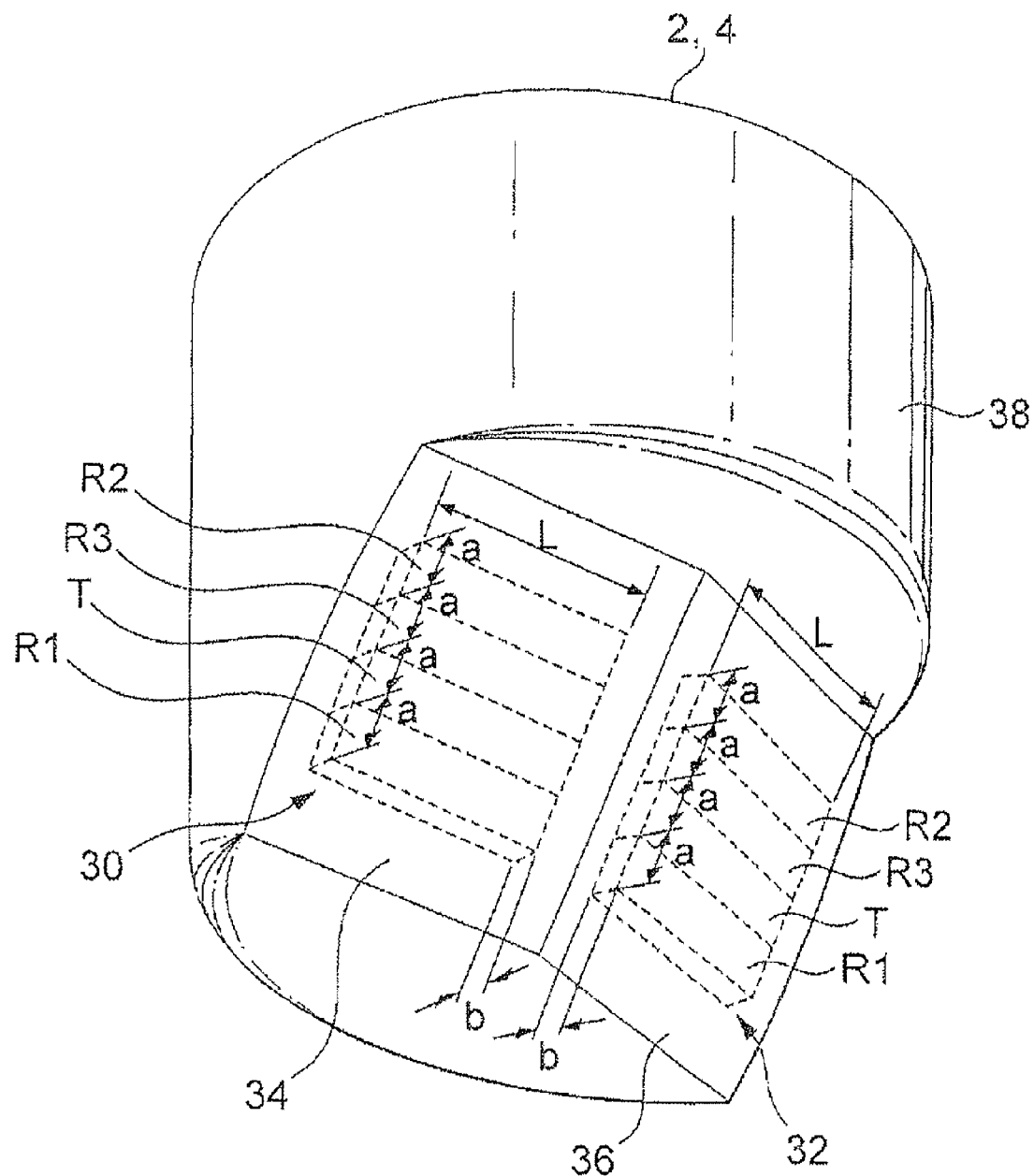
FIGS. 4a and 4b show perspective views of a transducer unit in the embodiment and the transducer arrays therein.
Figure 4B:
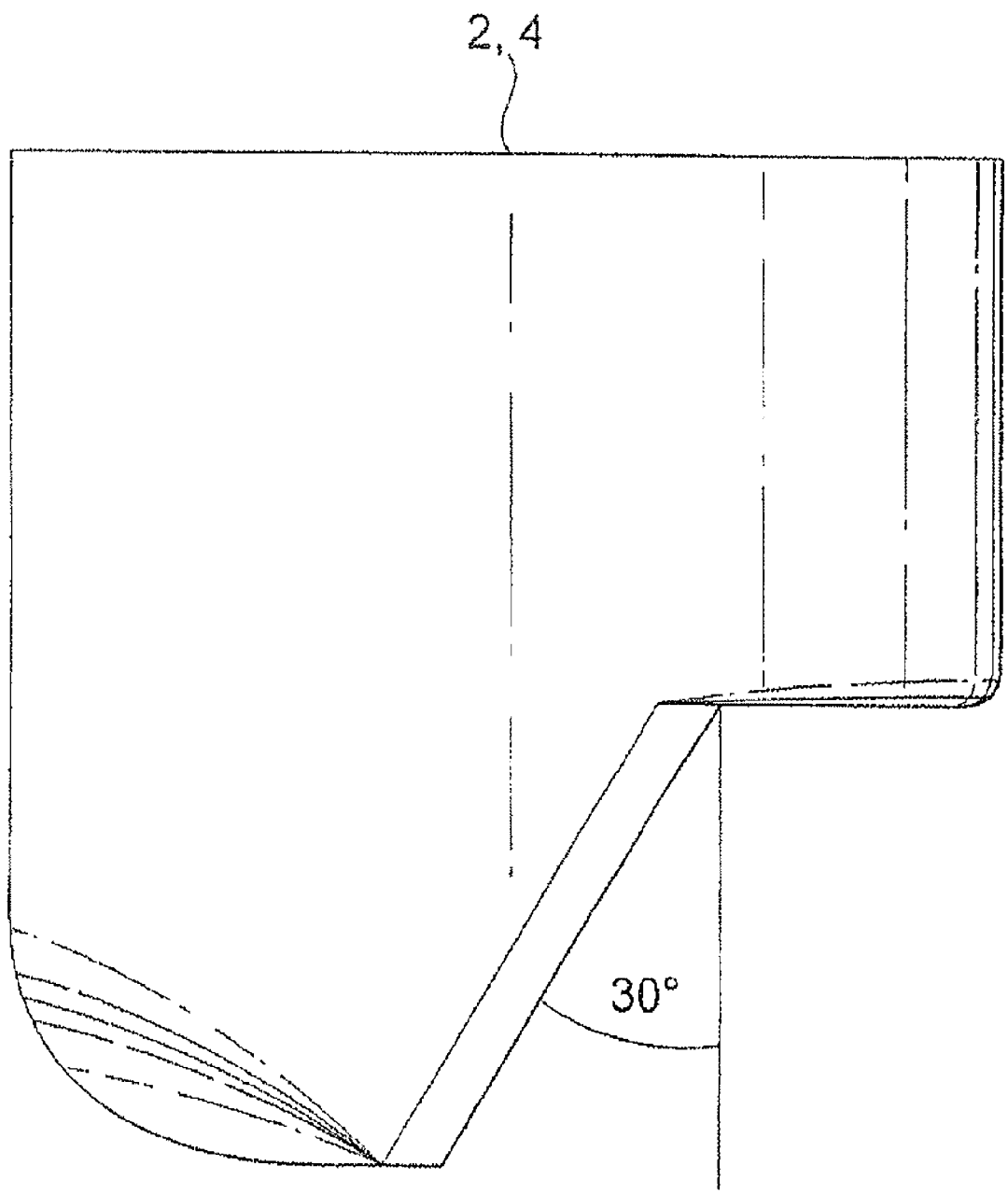

FIGS. 4a and 4b show the configuration of a transducer unit 2, 4. Each transducer unit 2, 4 contains a plurality of transducer arrays 30, 32, which number two in the present embodiment although a single transducer array or more than two transducer arrays could be provided within each transducer unit 2, 4.

Each transducer array 30, 32 comprises four individual transducers R1, R2, R3 and T mounted behind a window 34, 36 within a waterproof housing 38. Each window 34, 36 is transparent to the transmitted and received sound waves.

The transducer arrays 30, 32 are mounted within the waterproof housing 38 at an angle of 20° relative to each other in the horizontal plane (so as to face at angles of 10° and 30° respectively, relative to the centreline 20 of the boat 50 when arranged on the hull of the boat 50 as shown in FIG. 1a) and at an angle of 30° to the vertical (as shown in FIG. 4b).

The individual transducer R1, R2, R3, T within each array 30, are commercially available transducers in the form of rectangular blocks of piezoelectric material of length L (which in this embodiment is 25 mm), width A (which in this embodiment is 5 mm) and depth B which is specified so that the transducers are tuned to receive or transmit sound waves at a frequency of 200 kHz. The depth B is dependent upon the specific material of the transducer, which in this embodiment comprises lead zirconate titanate (PZT).

The dimensions and material of each transducer determine the angular size of the segment of water into which the transducer can transmit sound waves or receive sound waves. In the present embodiment, the transducers T, R1, R2 and R3 all have the same dimensions and are made of the same material. Accordingly, the segment of water from which the receiving transducers R1, R2 and R3 can receive reflected sound waves is the same as the segment of water into which the transmitting transducer T transmits sound waves.

The transducer T is a transmitter and each of the transducers R1, R2 and R3 is a receiver. Within each transducer array 30, 32, each individual transducer is separated from its neighbour by a strip of insulating material (not shown) so that all transducers in the array are electrically and acoustically isolated from each other.

Figure 5:
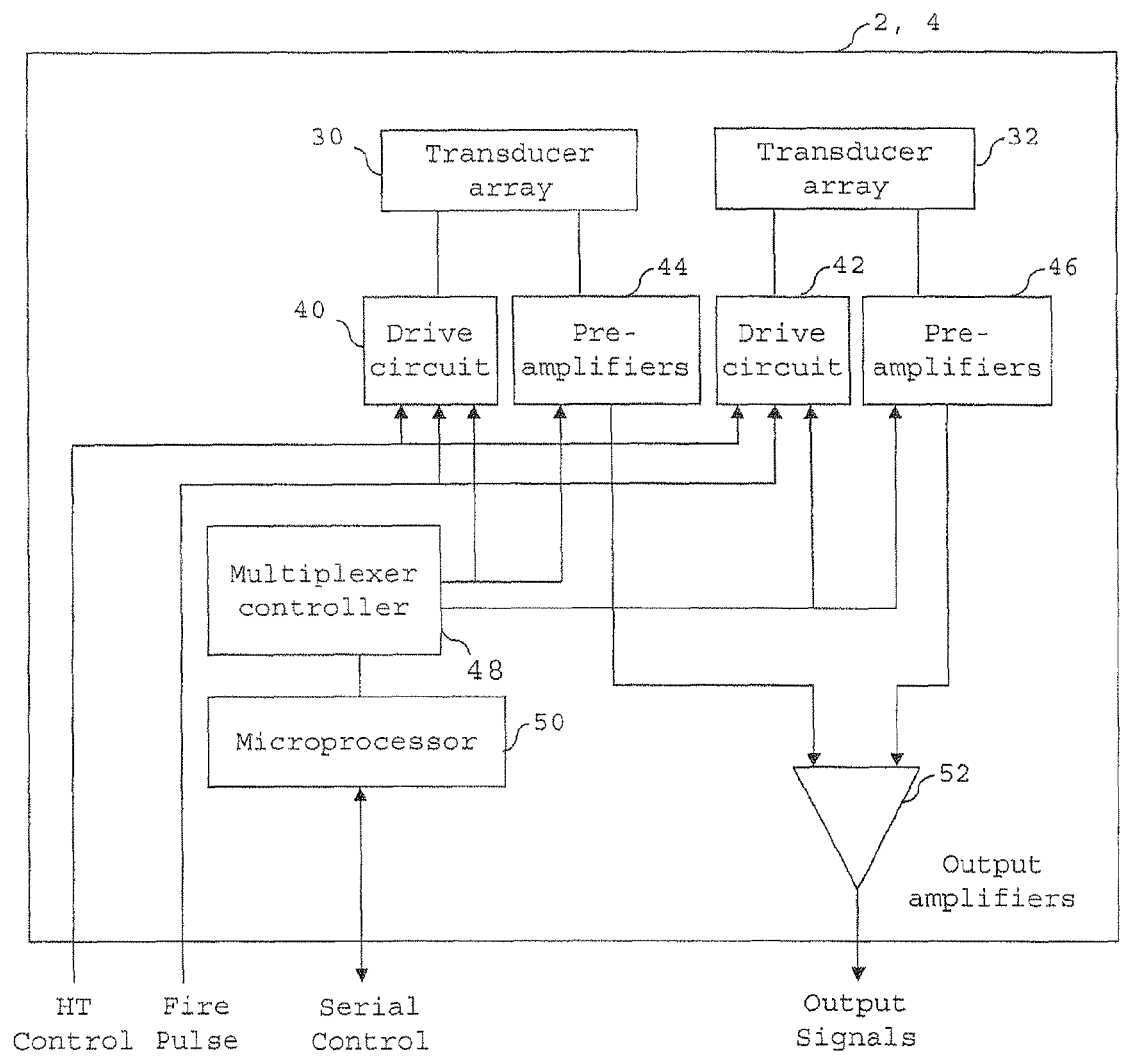
FIG. 5 is a schematic block diagram of the components in one of the transducer units.

Each of the port and starboard transducer units 2, 4 contains other components in addition to the transducer arrays 30, 32, as shown in FIG. 5 (which shows the components in a single one of the transducer units 2, 4 as the components are the same in each unit).

More particularly, referring to FIG. 5, each transducer array 30, 32 has its own drive circuit 40, 42 and preamplifiers 44, 46. The sound waves to be transmitted by the transmitting transducer T in each transducer array 30, 32 are controlled by the drive circuits 40, 42 in accordance with a fire pulse and an HT control signal from the transducer interface 6. More particularly, the fire pulse sets the duration of the pulse of the sound waves, while the HT control signal sets the amplitude of the transmitted sound waves. This arrangement allows for much greater flexibility over a wide range of operating conditions and, as explained below, is dependent on the range set by the user for the sonar apparatus. The preamplifiers 44, 46 are low noise to ensure that the system is detector noise limited, that is, it is the piezoelectric transducer elements and acoustic noise that limit the smallest signals that can be recovered rather than electronic noise in the amplification stages.

Each transducer array has an operational time comprising a transmission time during which it transmits a pulse of sound waves and a detection time during which it detects any sound waves that have been reflected from points on the underwater floor and travelled back to the transducer array. In the present embodiment, the transducer arrays are operated in sequence at different times such that their operational times are non-overlapping. In this way, the original transmitting source of a received sound wave can be reliably determined. More particularly, to ensure that the transducer arrays 30, 32 are operated at different times, a control signal is applied to the drive circuits 40, 42 by a multiplexer controller 48 and a microprocessor 50 in accordance with instructions from the transducer interface 6. This arrangement allows a simple one wire serial communication link between each transducer unit 2, 4 and the transducer interface 6 to enable the different transducer arrays to be controlled.

Sound signals that have been detected by the transducer arrays 30, 32, are preamplified in the preamplifiers 40, 46 and then further amplified by output amplifiers 52. Output amplifiers 52 deliver analogue signals to the transducer interface 6 that are matched to the line impedance characteristics. This allows longer cable runs to be used between the transducer units 2, 4 and the transducer interface 6 without significant loss and with lower noise pick up and less cross-talk.

Figure 6:
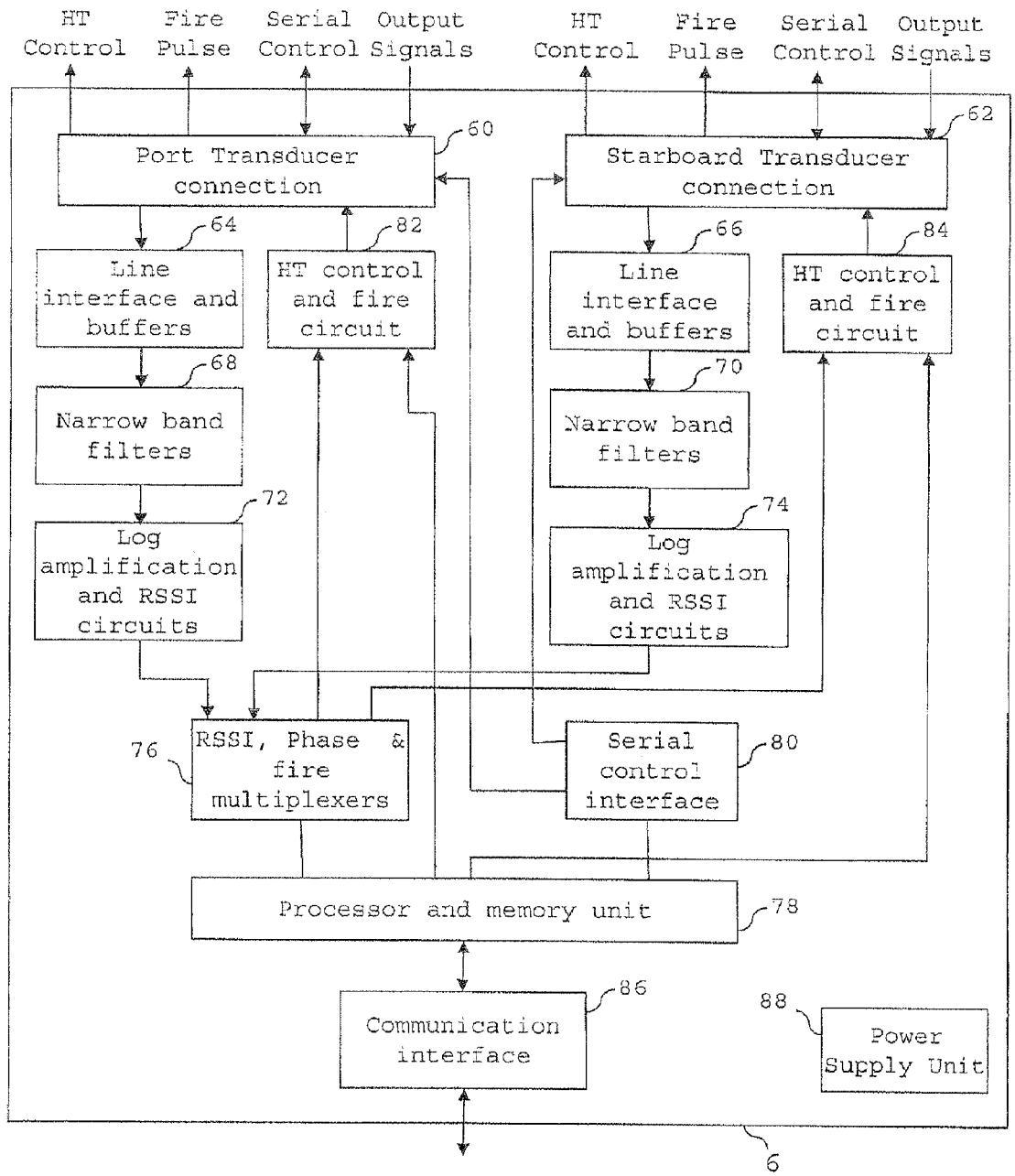
FIG. 6 is a schematic block diagram of the components in the transducer interface.

Turning now to FIG. 6, the components of the transducer interface 6 are shown.

The transducer interface 6 provides control signals to control the transducer arrays within the port and starboard transducer unit 2, 4, and furthermore provides initial data processing of the reflected sound signals that are received from the transducer arrays.

Referring to FIG. 6, port and starboard transducer connections 60, 62 pass signals that are received from, or transmitted to, the transducer units 2, 4 via wires 3.

The analogue output signals from the transducer arrays 30, 32 in the transducer units 2, 4 are buffered in the line interface and buffers 64, 66 and then passed through narrow band filters 68, 70 to remove unwanted signals and noise.

The filtered signals are passed to log amplification and RSSI circuits 72, 74. A separate log amplification and RSSI circuit is provided for each of the receiving transducers R1, R2 and R3 within each of the port and Starboard transducer units 30, 32. The output from each of these separate log amplification and RSSI circuits comprises two signals, namely an RSSI signal and a log-amplified signal for the associated receiving transducer. The RSSI signal provides a measure of received signal strength, namely the well-known RSSI measure. This measure of the input signal strength is directly proportional to the absolute decibel level.

RSSI, phase and fire multiplexers 76 multiplex the output signals from the log amplification and RSSI circuits 72, 74 and input the signals to a processor and memory unit 78.

Processor and memory unit 78 performs initial data processing of the signals, as described below, as well as generating control signals to control the transducer arrays 30, 32 within the port and starboard transducer units 2, 4 in accordance with signals received from the visual processor 8.

The control signals generated by processor and memory unit 78 are transmitted to the transducer arrays 30, 32 via the serial control interface 80, respective HT control and fire circuits 82, 84 and the respective port and starboard transducer connections 60, 62. The serial control interface 80 can be either a simple high/low level for sonar apparatus which utilise two transducer units 2, 4 or a one wire serial link for sonar apparatus which utilise more than two transducer units. This arrangement for transmitting the control signals to the transducer arrays 30, 32 allow different amplitude levels to be set for the transmitting transducer arrays in the different transducer units 2, 4, thereby allowing different amplitude levels to be used on either side of the boat 50 if required. For example, if the boat was travelling alongside a quay wall, the transmitting transducers T in the transducer unit 2, 4 nearest the wall could be set to emit sound signals with a low amplitude to prevent unwanted reflected sound signals being produced which could adversely affect the performance of the apparatus.

After data processing in the processor and memory unit 78, the data is transmitted to the visual processor 8 via communications interface 86, which can be either a serial link or, for a more complex system, a local area network (LAN). The communication interface 86 also receives command data from the visual processor 8' which controls the operation of the transducer interface 6.

Power supply unit 88 provides all the necessary voltage rails for the transducer interface 6 and the transducer arrays 30, 32 from the boat's power supply.

Figure 7:
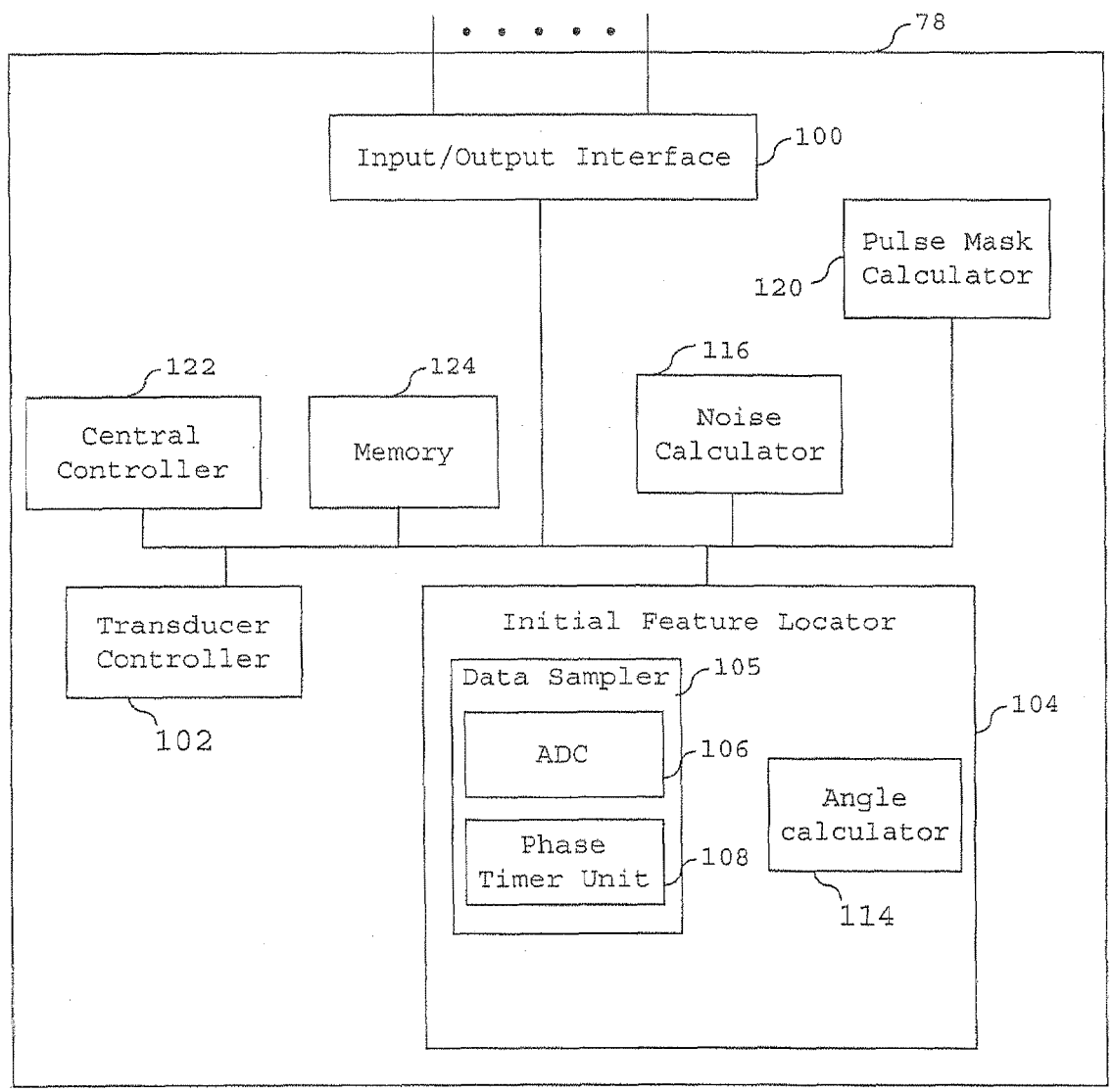
FIG. 7 is a schematic block diagram showing the functional units of the processor and memory unit of the transducer interface.

FIG. 7 shows the functional components of the processor and memory unit 78 for generating the command signals to control the transducer arrays 30, 32 and for processing the signals received from the transducer arrays 30, 32.

Referring to FIG. 7, input/output interface 100 is operable to receive signals from, and transmit signals to, the RSSI, phase and fire multiplexers 76, the serial control interface 80 and the HT control and fire circuits 82, 84.

Transducer controller 102 is operable to generate command signals for controlling the transducer arrays 30, 32 within each of the transducer units 2, 4 in dependence upon commands received from the visual processor 8.

The present embodiment includes a feature locator which is operable to process the output signals from the transducer arrays 30, 32 in the transducer units 2, 4 to calculate three-dimensional positions of points on the underwater floor within the segments 12, 14, 16, 18 that reflect sound signals back to the transducer arrays. In the present embodiment, the components of the feature locator are split between the transducer interface 6 and the visual processor 8. The components within the transducer interface 6 are provided in an initial feature locator 104, and these components comprise data-sampler 105 and angle calculator 114.

Data sampler 105 is operable to sample the analogue signals from the transducer arrays 30, 32 to generate digital sample values. More particularly, data sampler 105 comprises analogue-to-digital converter (ADC) 106 and phase timer unit 108. ADC 106 is operable to convert the analogue RSSI signal for receiving transducer R1 output from the log amplification and RSSI circuits 72, 74 into a digital signal at times defined by a signal from phase timer unit 108. Phase timer unit 108 is operable to provide a sample rate timer and a high speed counter to measure differential times. More particularly, phase timer unit 108 is operable to detect a predetermined transition of each log-amplified signal output from the log amplification and RSSI circuits 72, 74 for the receiving transducers R1, R2, R3 (this predetermined transition being a transition of the signal across 0 form a negative value to a positive value in the present embodiment) and to calculate a first difference comprising a difference between the occurrence time of the transition of the R2 signal and the occurrence time of the transition of the R1 signal, and also a second difference comprising a difference between the occurrence time of the transition of the R3 signal and the occurrence time of the transition of the R1 signal. These two time differences comprise phase transition time differences that are subsequently processed to determine the phase difference between the signals R2 and R1 and the phase difference between the signals R3 and R1. The output of data sampler 105 is therefore a stream of samples, wherein each sample comprises an RSSI value (for receiver R1) indicative of amplitude, and two phase transition time differences (for receivers R2-R1 and R3-R1) indicative of phase.

Angle calculator 114 is operable to process the samples from data sampler 105 to calculate for each sample the angle relative to the receiving transducer array of the point on the underwater floor in front of the boat 50 which reflected the sound waves to the transducer array.

Noise calculator 116 is operable to determine various noise characteristics of the signals from the transducer arrays 30, 32 for use in the processing by angle calculator 114 and visual processor 8 to discard spurious points.

Pulse mask calculator 120 is operable to calculate a transmission pulse mask that is used in the next subsequent set of processing operations to blank out initial, potentially erroneous samples so that they are not sent to the visual processor 8 for processing.

Central controller 122 is operable to perform administrative processing operations for the transducer interface 6 and is further operable to provide central control of the other functional components within the processor and memory unit 78.

Memory 124 is provided to store processing instructions and to store working data during operation of the functional components within the processor and memory unit 78.

Figure 8:
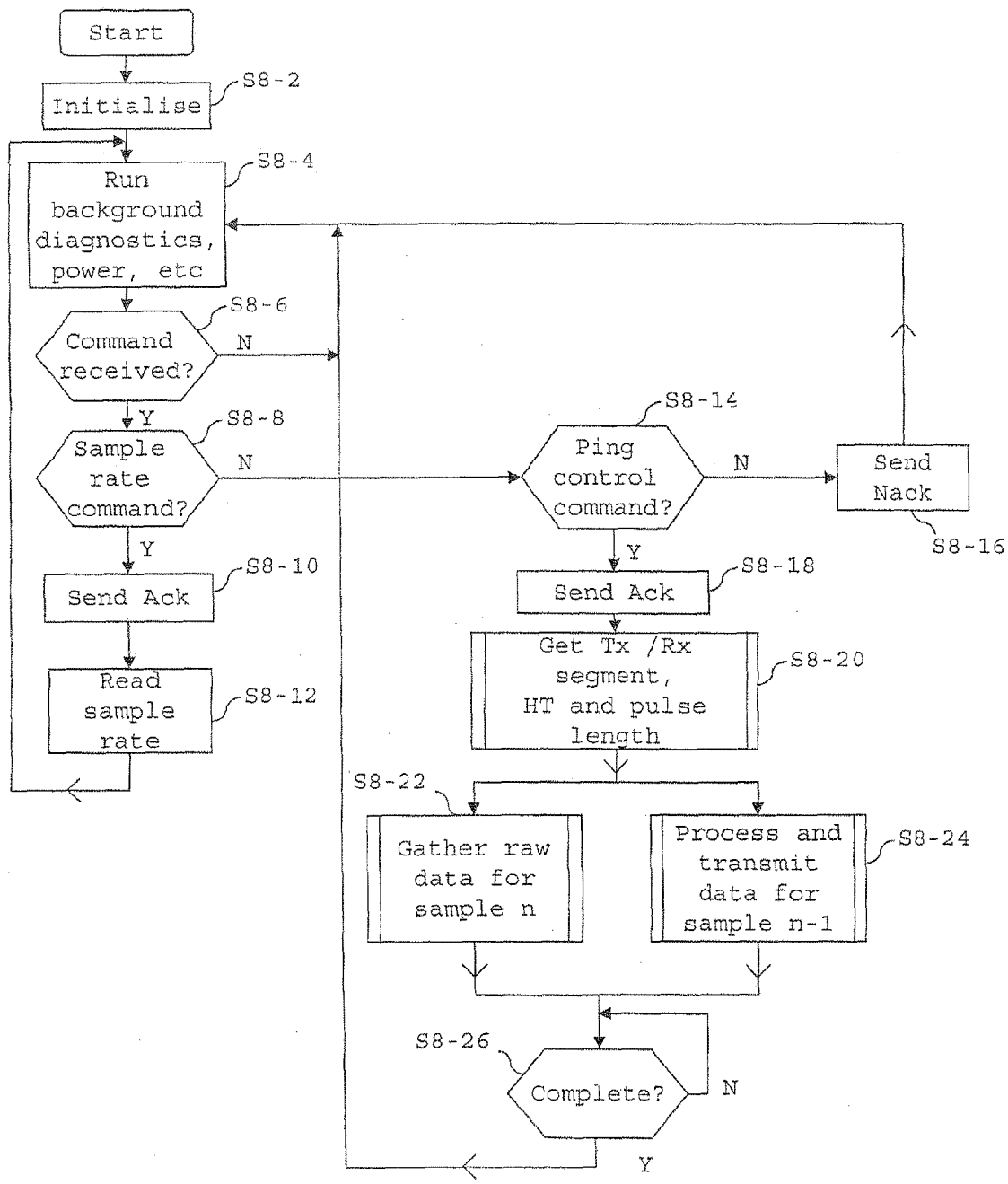
FIG. 8 is a flow chart showing the processing operations performed by the transducer interface.

The processing operations performed by the functional components units within processor and memory unit 78 will now be described with reference to FIG. 8.

At step S8-2, central controller 122 initialises the transducer interface 6 when power is turned on. During this initialisation, certain parameters are set to default values, as described hereinafter, to ensure that the sonar apparatus generates sensible answers during initial processing.

At step S8-4, central controller 122 runs background diagnostic tests, which monitor the operation of the transducer interface 6, and keep all power supplies functioning.

At step S8-6, central controller 122 determines whether a command has been received from the visual processor 8. If no such command is received, then processing returns to step S8-4. On the other hand, if a command is received from the visual processor 8, then processing proceeds to step S8-8, at which central controller 122 determines whether the received command is a sample rate command.

If the command received from the visual processor 8 is a sample rate command, then processing proceeds to step S8-10, at which central controller 122 sends an acknowledgement to the visual processor 8 and then step S8-12, at which transducer controller 102 sets the sample rate for data sampler 105 to be the rate specified in the received command from the visual processor 8.

On the other hand, if it is determined at step S8-8 that the command received from the visual processor 8 is not a sample rate command, then processing proceeds to step S8-14, at which central controller 122 determines whether the received command is a ping control command (that is, a command to drive a transducer T to transmit sound waves).

If it is determined at step S8-14 that the command is not a ping control command, then the type of command cannot be identified or there is an error in the syntax, and so processing proceeds to step S8-16, at which central controller 122 sends back an error signal to the visual processor 8.

On the other hand, if it is determined at step S8-14 that the received command is a ping control command, then central controller 122 sends an acknowledgement signal to the visual processor 8 step S8-18, and processing proceeds to step S8-20, at which transducer controller 102 reads the ping control command and sets transmission parameters to control a transmitting transducer T within one of the transducer arrays 30, 32 to transmit the next pulse of sound waves.

Figure 9:
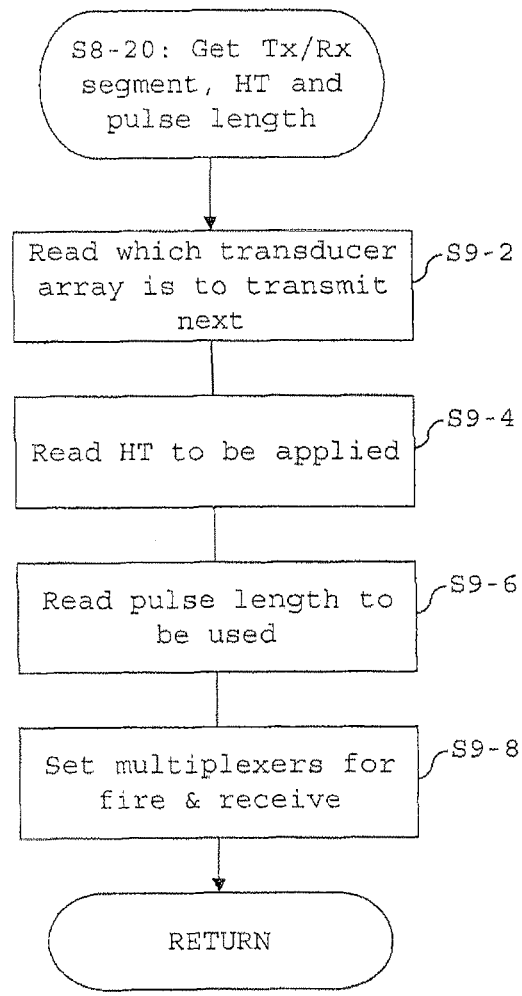
FIG. 9 is a flow chart showing the processing operations performed at step S8-20 in FIG. 8.

FIG. 9 shows the processing operations performed by transducer controller 102 at step S8-20.

Referring to FIG. 9, step S9-2 transducer controller 102 determines which of the four transducer arrays is to transmit sound waves next. More particularly, as explained previously, the transducer arrays are controlled to operate at different, non-overlapping operational times. In this embodiment, the transducer arrays are controlled to operate in sequence starting from the outer transducer on the port side, followed by the inner transducer on the port side, followed by the inner transducer on the starboard side and finally the outer transducer on the starboard side, with this sequence generating data for four respective segments of water 12, 14, 16, 18 (each segment corresponding to a respective transducer array) which are subsequently processed as a segment set. The sequence is then repeated. At step S9-2, transducer controller 102 reads from the ping control command received from the visual processor 8 at step S8-6 the identity of the transducer array that is to be used next for transmission and reception.

At step S9-4, transducer controller 102 reads from the ping control command the voltage to be applied to the transmitting transducer T in the transducer array, and at step S9-6 reads from the ping control command the pulse length to be used, that is time duration for which sound waves are to be transmitted by the transmitting transducer T.

At step S9-8, transducer controller 102 sets up the RSSI, phase and fire multiplexers 76 for the required transmission and reception sequence of the identified transducer array.

Referring again to FIG. 8, following step S8-20, processing proceeds to steps S8-22 and S8-24, which are performed in parallel, before processing returns to step S8-4 after it is determined at step S8-26 that the processing in both steps S8-22 and S8-24 is complete.

The processing performed at steps S8-22 and S8-24 will now be described in detail.

At step S8-22, transducer controller 102 activates the next transducer array in the sequence that was identified at step S8-20 and data sampler 105 gathers samples of data (which will be referred to as data for sample "n").

Figure 10:
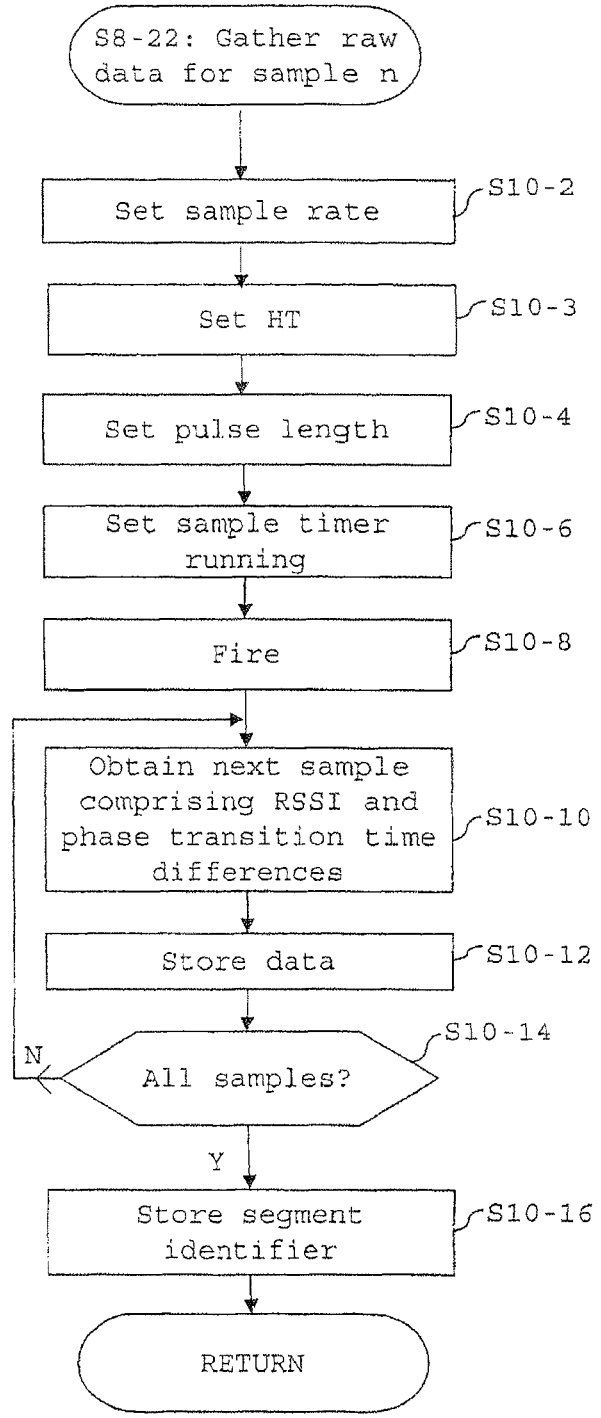
FIG. 10 is a flow chart showing the processing operations performed at step S8-22 in FIG. 8.

FIG. 10 shows the processing operations performed by transducer controller 102 and data sampler 105 at step S8-22.

Referring to FIG. 10, at step S10-2, transducer controller 102 sets the sample rate previously read at step S8-12, and at steps S10-3 and S10-4 sets the voltage (HT) and pulse length previously read at steps S9-4 and S9-6.

At step S10-6, transducer controller 102 sets the sample rate timer running in data sampler 105, and at step S10-8 fires the transmitting transducer T in the transducer array identified at step S9-2 for the length of time set by the pulse length.

At step S10-10, the reflected sound waves received by the transducers R1, R2 and R3 in the transducer array in response to the transmission of the sound waves by the transmitting transducer T are processed to obtain the next sample (this being the first sample the first time step S10-10 is performed). As explained previously, this sample comprises an RSSI value and two phase transition time differences.

More particularly, as explained previously in connection with FIG. 6, a respective log amplification and RSSI circuit is provided within the circuits 72, 74 for each of the receiving transducers R1, R2 and R3 in each transducer array. The output from each respective log amplification and RSSI circuit is an analogue RSSI signal defining signal strength and an analogue log-amplified signal. At step S10-10, the analogue RSSI signal for the receiving transducer R1 and the three analogue log-amplified signals (one for each of the receiving transducers R1, R2 and R3) are processed to obtain a sample comprising a single RSSI value and two phase transition time difference values.

In more detail, the signals are processed at step S10-10 using ADC 106 and phase timer unit 108. ADC 106 receives the analogue RSSI signal for receiver R1 as an input. Phase timer unit 108 provides a sample rate timer and a high speed counter. Phase timer unit 108 has three input capture pins which allow differential times to be measured. Each of the input capture pins receives a respective one of the log-amplified signals R1, R2, R3. The sample rate timer provides an interrupt signal to the ADC 106 at an interval defined by the set sample rate, which triggers the ADC to output a digital RSSI value at that time for the signal originating from receiving transducer R1, and furthermore starts the high speed counter running.

The log-amplified signals R1, R2, R3 are presented to the high speed counter, which detects when a predetermined transition on an input pin occurs, this transition being a transition across from a negative value to a positive value in the present embodiment, although a different transition could be detected instead. The value of the counter at that time is stored for each of the input signals. The difference between the counter values for receiving transducer R2 and receiving transducer R1 is stored, as well as the difference between the counter values for receiving transducer R3 and receiving transducer R1. These phase transition time difference values, together with the input signal period and the counter frequency, give a relative time which is translated into phase measurements during later processing.

In summary, therefore, the sample obtained at step S10-10 contains one RSSI value (from the R1 signal) and two phase transition time differences (namely R2-R1 and R3-R1).

At step S10-12, the sample data obtained at step S10-10 is stored in memory 124.

At step S10-14 data sampler 104 determines whether all required samples have been obtained. More particularly, as explained later, 1600 samples are obtained for each firing of a transducer array. Steps S10-10 to S10-14 are repeated until all 1600 samples have been obtained.

At step S10-16, data sampler 104 stores an identifier in association with the sample data stored at step S10-12, which identifier identifies the transducer array that was fired at step S10-8 and from which the samples have been obtained.

Referring again to FIG. 8, the processing operations performed at step S8-24, which is performed in parallel with the processing at step S8-22, will now be described.

At step S8-24, the data that was obtained on the previous iteration of step S8-22 (that is the data for sample "n−1" from the preceding transducer array in the fire sequence) is processed and the processed data is transmitted to the visual processor 8.

Figure 11:
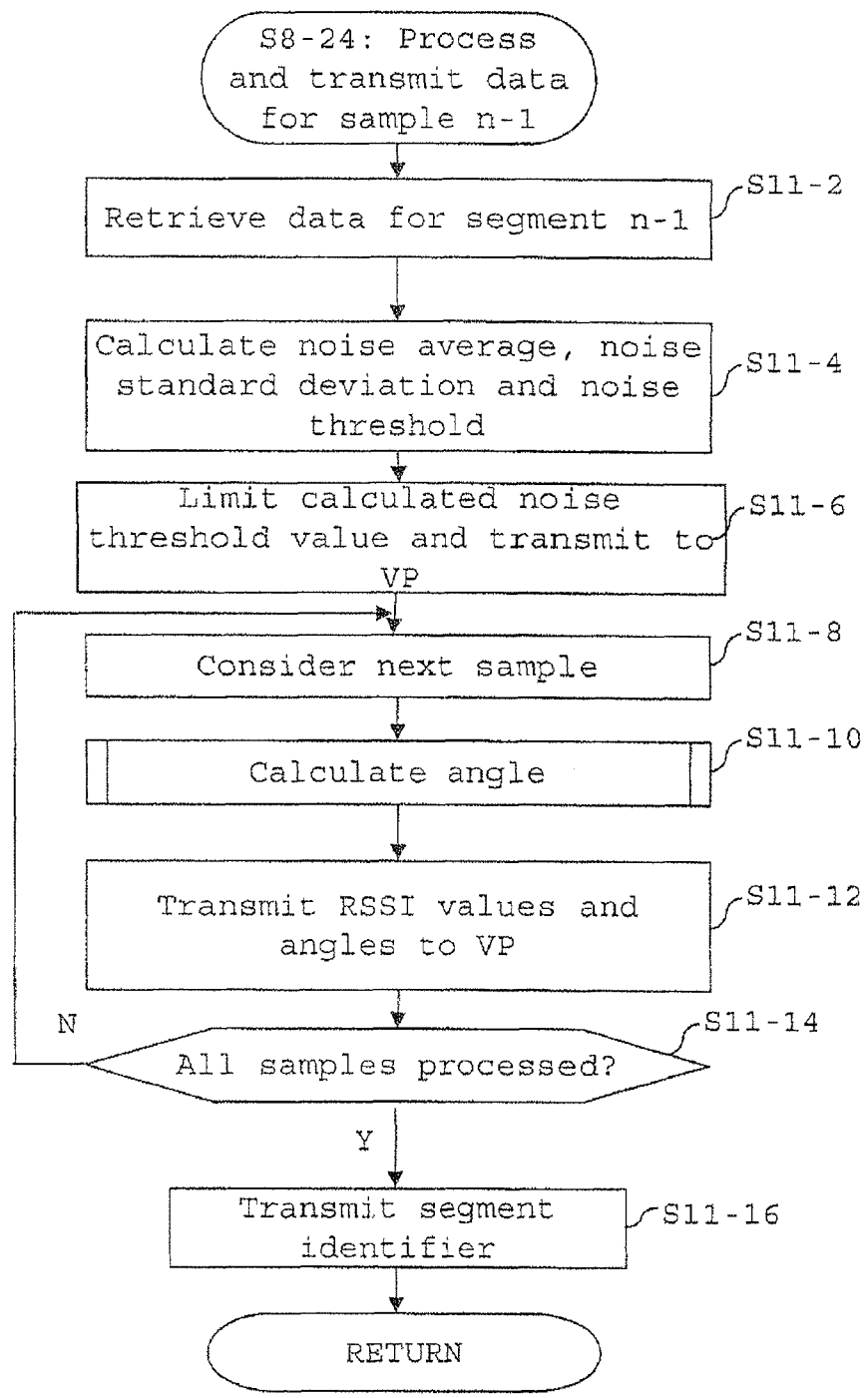
FIG. 11 is a flow chart showing the processing operations performed at step S8-24 in FIG. 8.

FIG. 11 shows the processing operations performed at step S8-24.

Referring to FIG. 11, at step S11-2 central controller 122 retrieves the data for segment n−1 from memory 124 (where it was stored at step S10-12 on the previous iteration of step S8-22).

At step S11-4, noise calculator 116 processes the retrieved data for segment n−1 to calculate a noise average, noise standard deviation and noise threshold for use in subsequent processing. More particularly, noise calculator 116 processes the RSSI values of the last 100 samples (these samples representing sound waves reflected by points which are furthest away) to calculate a noise average and noise standard deviation. Noise calculator 116 then calculates a noise threshold value, which in this embodiment is set as the sum of the determined noise average plus the determined noise standard deviation.

At step S11-16, noise calculator 116 checks the noise threshold value calculated at step S11-4 to determine if it exceeds a predetermined threshold and, if it exceeds the threshold, then noise calculator 116 limits the value so that it no longer exceeds the threshold value. Noise calculator 116 then transmits the noise threshold value to the visual processor 8.

At step S11-8, angle calculator 122 reads the data for the next sample in the segment that was retrieved from memory at step S11-2 (this being the first sample the first time step S11-8 is performed).

At step S11-10, angle calculator 114 processes the two phase transition time differences in the sample data read at step S11-8 to calculate an angle for the sample, this angle being the angle relative to the receiving transducer from which the sound signals for that sample were received from a feature on the underwater floor which reflected the sound signals.

Figure 12:
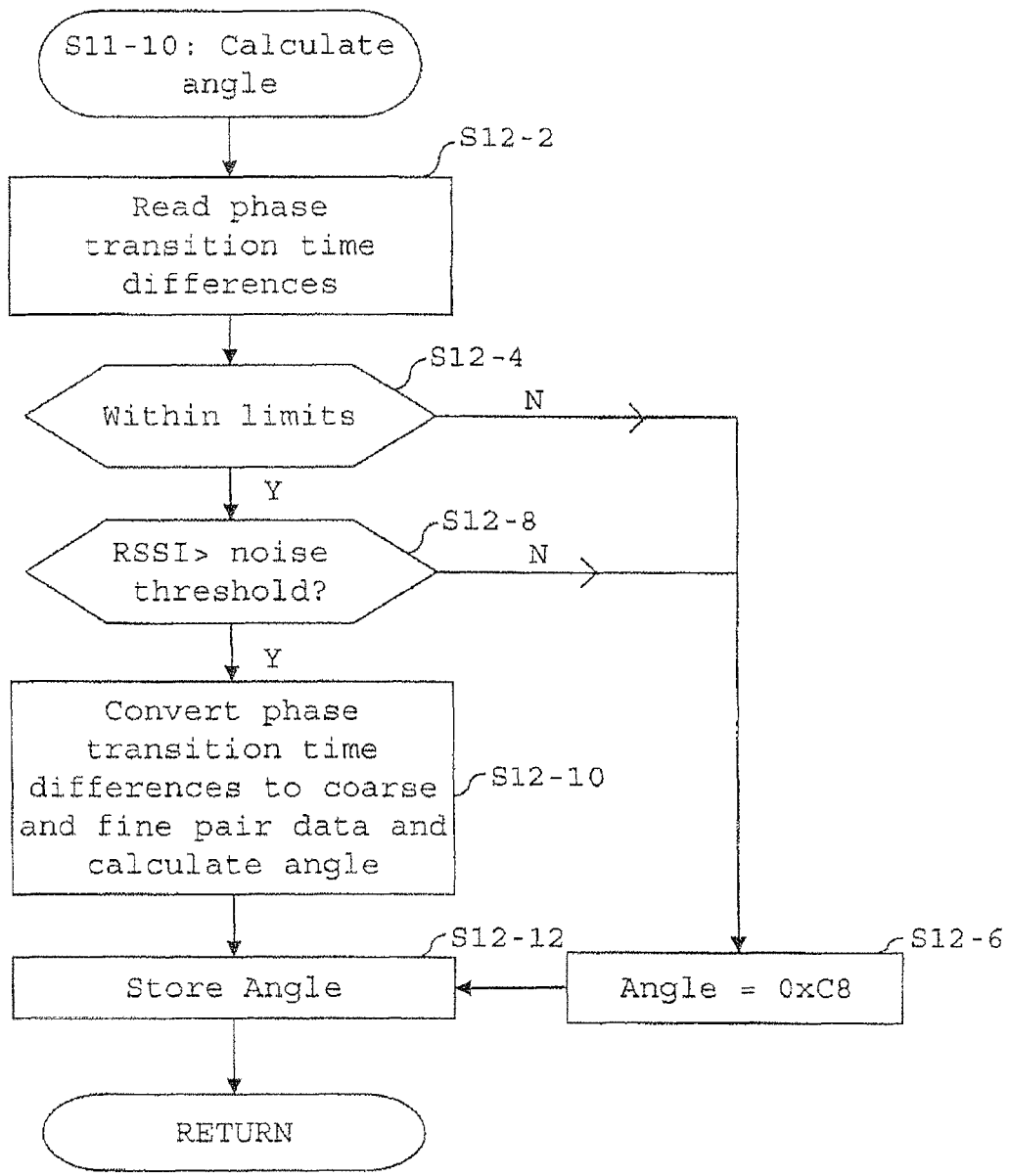
FIG. 12 is a flow chart showing the processing operations performed at step S11-10 in FIG. 11.

FIG. 12 shows the processing operations performed by angle calculator 114 at step S11-10.

Referring to FIG. 12, at step S12-2, angle calculator 114 reads the two phase transition time differences for the sample currently being processed, and at step S12-4 determines whether each time difference is within the correct limit to provide a sensible answer. These limits depend upon the timer frequency and the transmission frequency. In the present embodiment, the limits are 5.4 microseconds, which is slightly more than one cycle at 200 kHz.

If it is determined that either phase transition time difference is not within the required limit at step S12-4, then processing proceeds to step S12-6, at which angle calculator 114 sets the angle for the sample to be 0×C8 (representing 200°), this value being used because it is greater than any real angle that would be encountered and can therefore subsequently be detected and discarded during subsequent processing. The value 0×C8 is used because, in the present embodiment, only integer angle values can be transmitted from the transducer interface 6 to the visual processor 8. Accordingly, so as to provide a resolution of 0.5°, all angles are set to be twice their actual value. 0×C8 is 200 decimal which is outside the 180° required for positive angles.

On the other hand, if it is determined at step S12-4 that both phase transition time differences are within the required limits, then processing proceeds to step S12-8, at which angle calculator 114 checks the RSSI value for the current sample to determine whether it is greater than the noise threshold previously calculated for the current segment at step S11-4. If it is determined that the RSSI value does not exceed the noise threshold, then processing proceeds to step S12-6, at which angle calculator 114 sets the angle for the current sample to be 0×C8.

On the other hand, if it is determined at step S12-8 that the RSSI value is above the noise threshold, then processing proceeds to step S12-10, at which angle calculator 114 converts the phase transition time differences read at step S12-2 to coarse and fine pair data and calculates an angle for the sample, this angle being the angle relative to the receiving transducer array of the point which reflected the sound waves that generated the current sample. More particularly, angle calculator 114 processes the phase transition time difference between receiving transducers R1 and R2 to calculate a first location signal which defines a plurality of possible angles for the reflecting feature on the underwater floor, each angle having a high angular accuracy. Angle calculator 114 processes the phase transition time difference for receiving transducers R2 and R3 to generate a second location signal which defines an unambiguous angle for the reflecting feature on the underwater floor, but with low angular accuracy. Angle calculator 114 combines the first and second location signals to define an unambiguous angle for the reflecting feature on the underwater floor with high angular accuracy. Angle calculator 114 performs this processing in the same way as described in WO 93/07506, U.S. Pat. No. 5,530,680 and EP 0,624,253, the full contents of which are incorporated, herein by cross-reference.

At step S12-12, angle calculator 114 stores the angle calculated at step S12-10 (or set at step S12-6) for the current sample.

Referring again to FIG. 11, at step S11-12, initial feature locator 104 transmits the RSSI value and angle for the current sample to visual processor 8.

At step S11-14, angle calculator 114 determines whether all samples in the data retrieved at step S11-2 have been processed. Steps S11-8 to S11-14 are repeated until each sample in the segment has been processed in the way described above.

At step S11-16, initial feature locater 104 transmits a segment identifier to the visual processor 8 identifying the transducer array from which the samples transmitted at step S11-12 originated.

Having described the processing operations performed by the transducer interface 6, the components of the visual processor 8 and the processing operations performed by those components will now be described.

The visual processor 8 in the present embodiment comprises a computer with a processor and memory housed in an enclosure with its own power supply. The main functions of the visual processor 8 are to generate commands for controlling the transducer arrays in the transducer units 2, 4 and processing the data that is received from the transducer interface 6 to complete the calculation of the three-dimensional positions of points on the underwater floor in front of the boat 50 and to generate image data for display showing the underwater floor in front of the boat 50.

Figure 13:
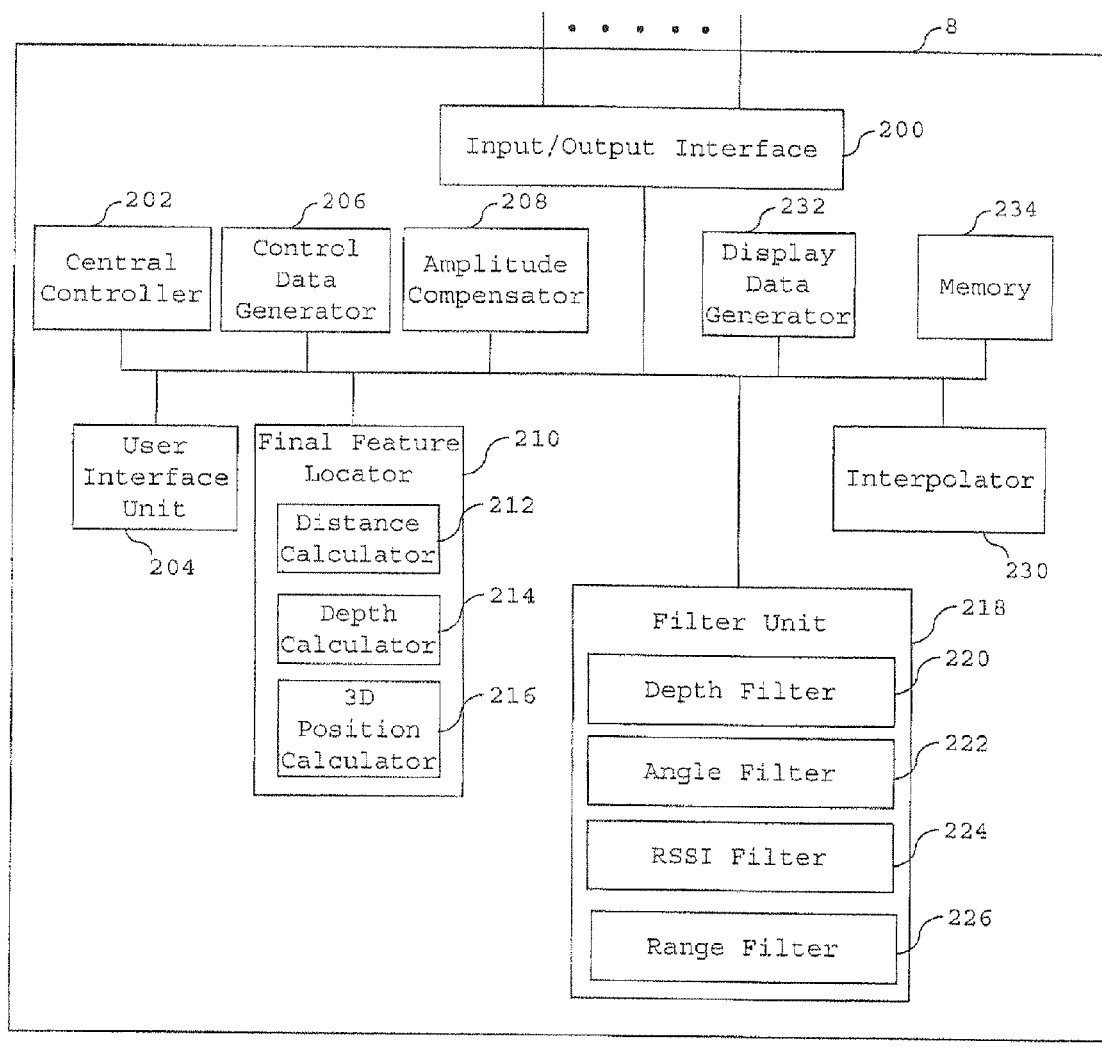
FIG. 13 is a schematic block diagram showing the functional units of the visual processor.

FIG. 13 shows the functional components of the visual processor 8.

Input/output interface 200 is operable to receive data from, and transmit data to, transducer interface 6.

Central controller 202 is operable to perform general administrative tasks and to control the other functional components.

User interface unit 204 is operable to provide a user interface to enable a user to enter data, change the operating range of the sonar apparatus and to change the viewing direction from which the display data is rendered to generate the image data for display on display 10.

Control data generator 206 is operable to generate the sample rate command and ping control command for transmission to the transducer interface 6.

Amplitude compensator 208 is operable to process the RSSI values of the samples received from the transducer interface 6 to generate compensated RSSI values taking into account transmission losses during propagation of, the sound waves through the water.

Final feature located 210 contains functional components for completing the feature location calculations that were started by the initial feature locator 104 in the transducer interface 6. Final feature locator 210 comprises distance calculator 212, depth calculated 214 and 3D position calculator 216. Distance calculator 212 is operable to process the angle data for each sample received from the transducer interface 6 to calculate the distance of the reflecting point on the underwater floor in front of the boat 50. Depth calculated 214 is operable to process the angle data for each sample received from the transducer interface 6 to calculate the depth of the reflecting point on the underwater floor. 3D position calculator 316 is operable to calculate a three-dimensional position, for each sample comprising coordinates defining the position of the reflecting point for the sample in three-dimensions.

Filter unit 218 is operable to perform various filtering operations on the data received from the transducer interface 6. Filter unit 218 comprises depth filter 220 operable to process the data to remove samples with spurious depths, angle filter 222 operable to process the data to remove samples with spurious angles, RSSI filter 224 operable to process the data to remove samples with spurious RSSI values, and range filter 226 operable to process the data to remove calculated 3D points with spurious ranges.

Interpolator 230 is operable to process the three-dimensional positions of the reflecting points on the underwater floor calculated by 3D position calculator 216 (these points being points within the segments of water 12, 14, 16, 18 into which, and from which, the transducer arrays transmit and receive sound waves) to calculate three-dimensional positions of points on the underwater floor in front of the boat that are in between the segments 12, 14, 16, 18.

Display data generator 232 is operable to render the three-dimensional positions representing points on the underwater floor to generate image data for display on display 10. In this embodiment, display data generator 232 comprises VSG's Open Inventor and MeshViz software components, although other rendering software could be used instead.

Memory 234 is provided to store processing instructions, as well as data generated by the functional components.

Figure 14:
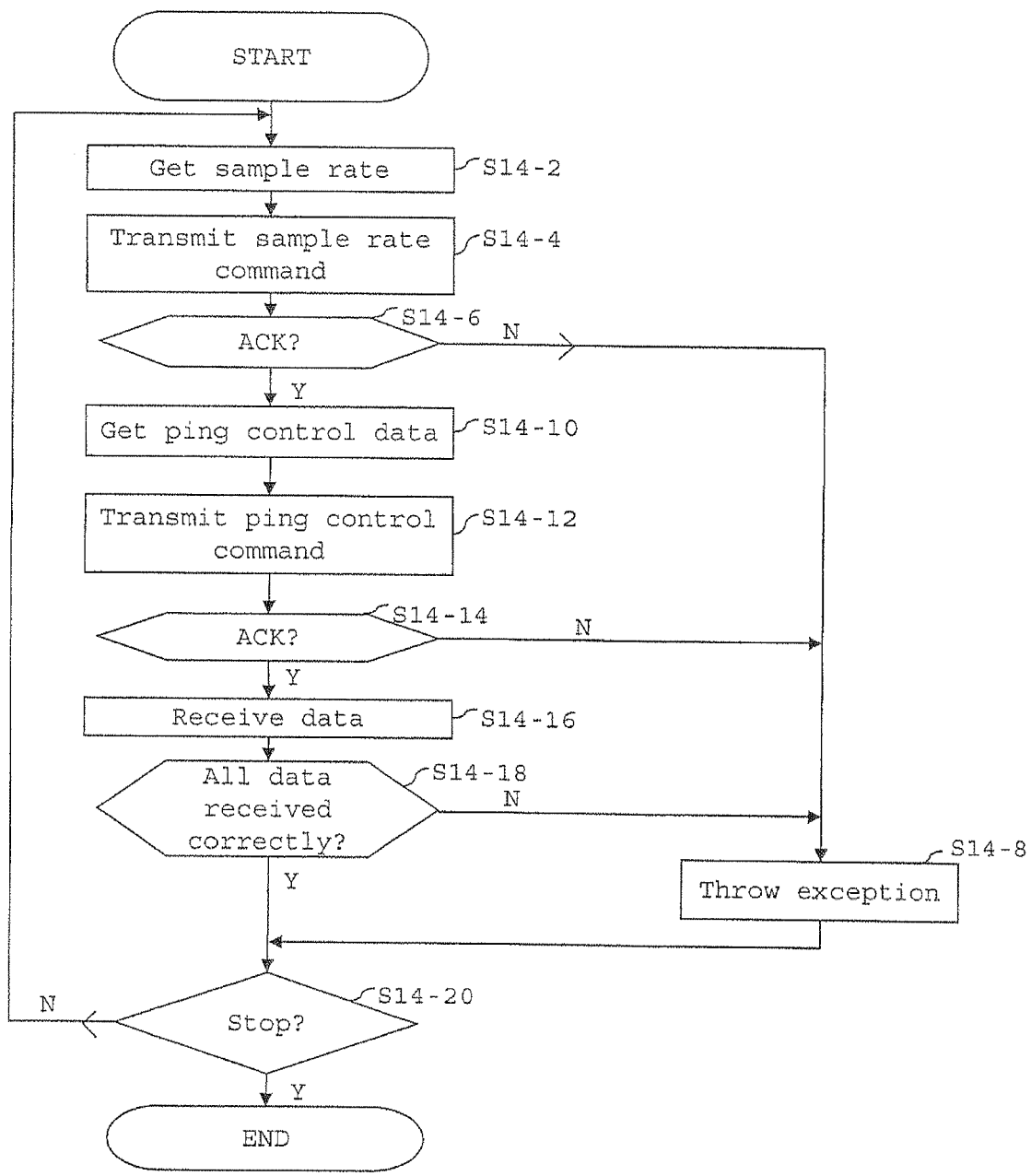
FIG. 14 is a flow chart showing the processing operations performed by the visual processor to transmit data to, and receive data from, the transducer interface.

FIG. 14 shows the processing operations performed by visual processor 8 to generate and transmit commands to transducer interface 6, and to receive and store data from transducer interface 6.

Referring to FIG. 14, at step S14-2, control data generator 206 retrieves the sampling rate for the current range set by the user for the sonar apparatus. More particularly the rate is set to allow 1600 samples generated by data sampler 105 for a single segment 12, 14, 16, 18 (each sample comprising an RSSI value and an angle value) to be transmitted from the transducer interface 6 to the visual processor 8 in 0.25 seconds, thereby permitting the samples for all four segments 12, 14, 16, 18 to be transmitted serially in 1 second. To allow for different distance resolutions, one of three different sample rates is selected depending upon whether the set range is short, medium or long. In the present embodiment, short ranges are defined to be less than or equal to 40 m, medium ranges are defined to be greater than 40 m and less than or equal to 100 m, and long ranges are defined to be greater than 100 m. However, the different values could be set for each range. For medium ranges, the sample rate is chosen to give a resolution of 0.1 m (at 1500 m/s velocity of sound) and, in this embodiment, is set to 134 μs. However, this limits the maximum range to 160 m or 138 m ahead by 80 m depth. In order to overcome this, the sampling rate is changed for long ranges to give a resolution of 0.2 m, thereby allowing a range of 320 m or 300 m ahead at 100 m depth. In this embodiment, the sampling rate for long ranges is set to 268 μs. For short ranges, more resolution is desirable because the boat 50 is closer to the reflecting points. Accordingly, for short ranges, the sampling rate is reduced to give a resolution of 0.05 m, thereby producing a more detailed picture on the display 10. In this embodiment the sampling rate for short ranges is set to 67 μs.

At step S14-4, control data generator 206 transmits a sample rate command defining the sample rate read at step S14-2 to transducer interface 6, and at step S14-6 awaits an acknowledgment signal from the transducer interface 6.

If no acknowledgment signal is received at step S14-6, processing proceeds to step S14-8, at which control data generator 206 flags an exception and displays a warning on display 10.

On the other hand, if the sample rate command is correctly acknowledged by the transducer interface 6, then processing proceeds to step S14-10, at which control data generator 206 retrieves the data to generate a ping control command based upon the range currently set for the sonar apparatus. More particularly, control data generator 206 determines which transducer array is to transmit next in the sequence, and reads the voltage (HT) to be applied to the transducer array and the pulse length (duration) for which sound waves are to be transmitted by the transducer array. The voltage to applied is typically constant, whereas the pulse length increases as the range increases.

At step S14-12, control data generator 206 transmits a ping control command to the transducer interface 6 defining the information read at step S14-10, and at step S14-14 awaits an acknowledgment from the transducer interface 6.

If no acknowledgement is received from the transducer interface 6 at step S14-14, then processing proceeds to step S14-8 at which control data generator 206 flags an exception and displays a warning on display 10.

On the other hand, if the ping control command is successfully received by the transducer interface 6, then at step S14-

16, a stream of sample data is received from the transducer interface 6 and is stored by central controller 202 in memory 234. The received data is data from the firing of one transducer array and comprises a noise threshold value (transmitted by the transducer interface 6 at step S11-6 described previously), sample data for each reflecting point on the underwater floor comprising an RSSI value and an angle value transmitted by the transducer interface 6 at step S11-12 described previously) and data identifying the transducer array from which the samples originated (transmitted by the transducer interface 6 at step 11-16 described previously).

At step S14-18, central controller 202 checks whether all data was received correctly at step S14-16 and, if it was not, flags an exception and displays a warning on display 10 at step S14-8.

Processing operations S14-2 to S14-18 are repeated until the visual processor 8 is turned off.

Figure 15:
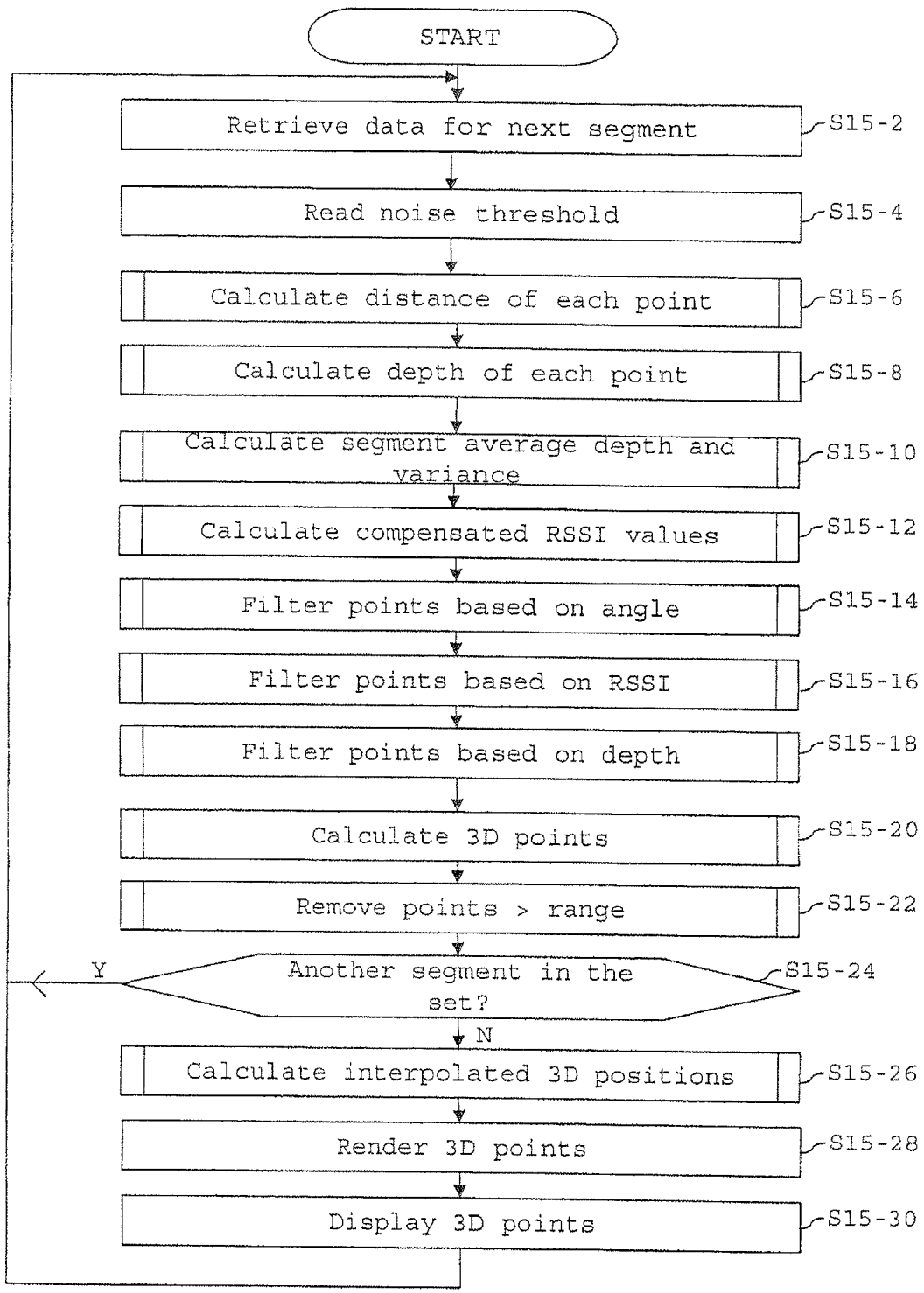
FIG. 15 is a flow chart showing the processing operations performed by the visual processor to process data received from the transducer interface.

FIG. 15 shows the processing operations performed by visual processor 8 to process data received from the transducer interface 6.

Referring to FIG. 15, visual processor 8 processes the data in segment sets, where each set comprises four segments of data corresponding to the segments 12, 14, 16, 18, namely data from each respective transducer array. Accordingly, at step S15-2, central controller 202 retrieves the data for the next segment in a set (this being the data for the first segment the first time step S15-2 is performed) and at step S15-4 reads the noise threshold for the segment that is specified in the data.

Figure 16:
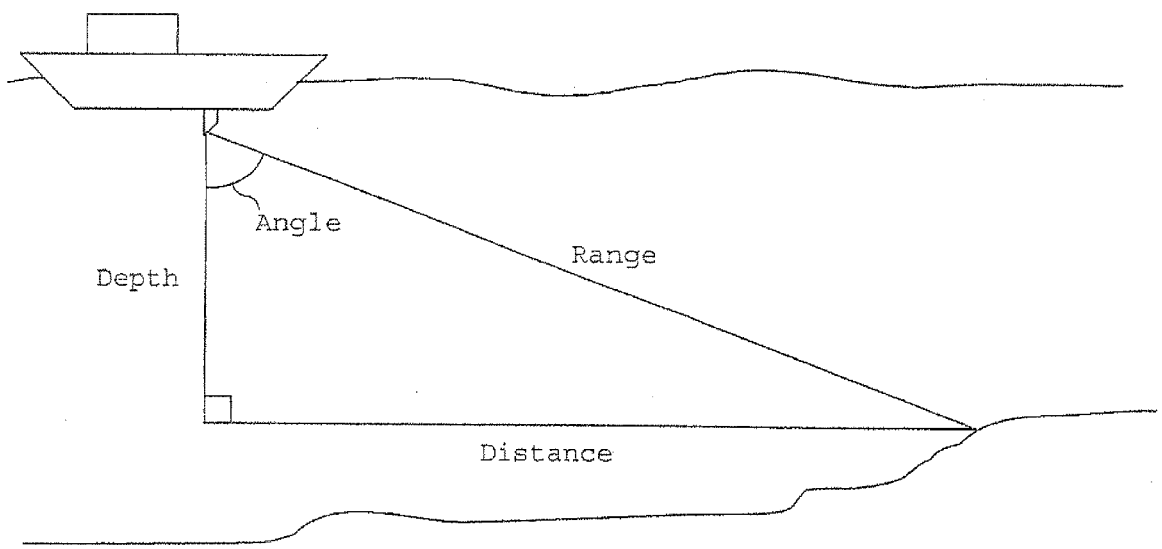
FIG. 16 is a diagram illustrating the relationship between the range, angle, depth and distance of a point on the underwater floor in front of the boat.

At step S15-6, distance calculator 212 processes each sample within the segment to calculate the horizontal distance of the reflecting point on the underwater floor along a line in the direction of the transducer array (in a direction ±10° or ±30° from the centre line 20, depending on the transducer array). More particularly, referring to FIG. 16, the relationship between the range, angle, distance and depth of each reflecting point on the underwater floor is shown. The range is defined by the position of the sample within the segment of data because this position is dependent upon the time at which the sound waves giving rise to the sample were received by the transducer array, and this time is dependent upon the distance travelled by the sound waves to and from the reflecting point. The angle is the angle defined in the data for each sample that was calculated and transmitted by the transducer interface 6 at steps S11-10 and S11-12 described previously.

Figure 17:
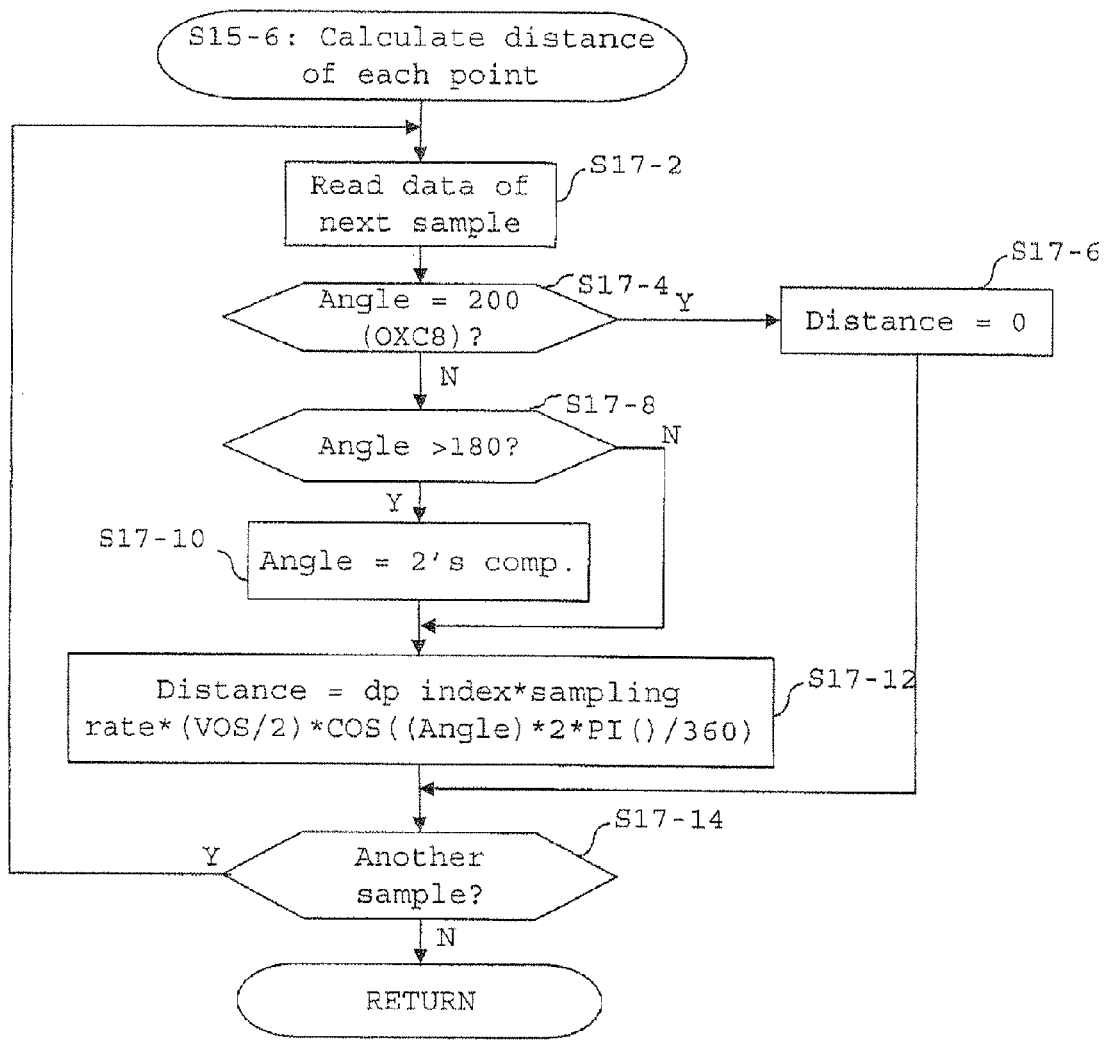
FIG. 17 is a flow chart showing the processing operations performed at step S15-6 in FIG. 15.

FIG. 17 shows the processing operations performed by distance calculator 212 at step S15-6.

Referring to FIG. 17 at step S17-2, distance calculator 212 reads the data of the next sample (this being the first sample the first time step S17-2 is performed), and at step S17-4 determines whether the angle for the sample is equal to 200° (that is 0xC8), which represents an error code transmitted from the transducer interface 6 indicating that the angular value is invalid. Accordingly, if it is determined at step S17-4 that the angle is equal to 200°, then processing proceeds to step S17-6, at which distance calculator 212 sets the distance of the reflecting point to be 0 m, indicating an invalid distance.

On the other hand, if it is determined at step 17-4 that the angle is not equal to 200°, then processing proceeds to step S17-8, at which distance calculator 212 determines whether the angle is greater than 180° (it being recalled that actual angular values are doubled by the transducer interface 6 to allow for higher angular resolution, so that a test for an angle greater than 180° is necessary rather than 90° which is the actual positive angle).

If it is determined at step S17-8 that the angle is greater than 180°, then processing proceeds to step S17-10, at which distance calculator 212 sets the angle for the sample to be equal to 2's compliment. On the other hand, if it is determined at step S17-8 that the angle is not greater than 180°, then step S17-10 is omitted.

At step S17-12, distance calculator 212 calculates the distance of the point for the current sample using the equation:

$$\text{distance} = (dp \text{ index}) \times (\text{sampling rate}) \times (\text{VOS}/2) \times \cos((\text{Angle}) \times 2PI(\ )/360) \quad \text{Equation 1}$$

where "dp index" is the position of the sample within the segment, "VOS" is the velocity of sound and "2PI( )/360" converts angular data in degrees into radians.

At step S17-14, distance calculator 212 determines whether another sample is present in the data for the current segment, and steps S17-2 to S17-14 are repeated until each sample has been processed in the way described above.

Referring again to FIG. 15, at step S15-8, depth calculator 214 processes the data for each sample in the current segment to calculate a depth for each reflecting point on the underwater floor.

Figure 18:
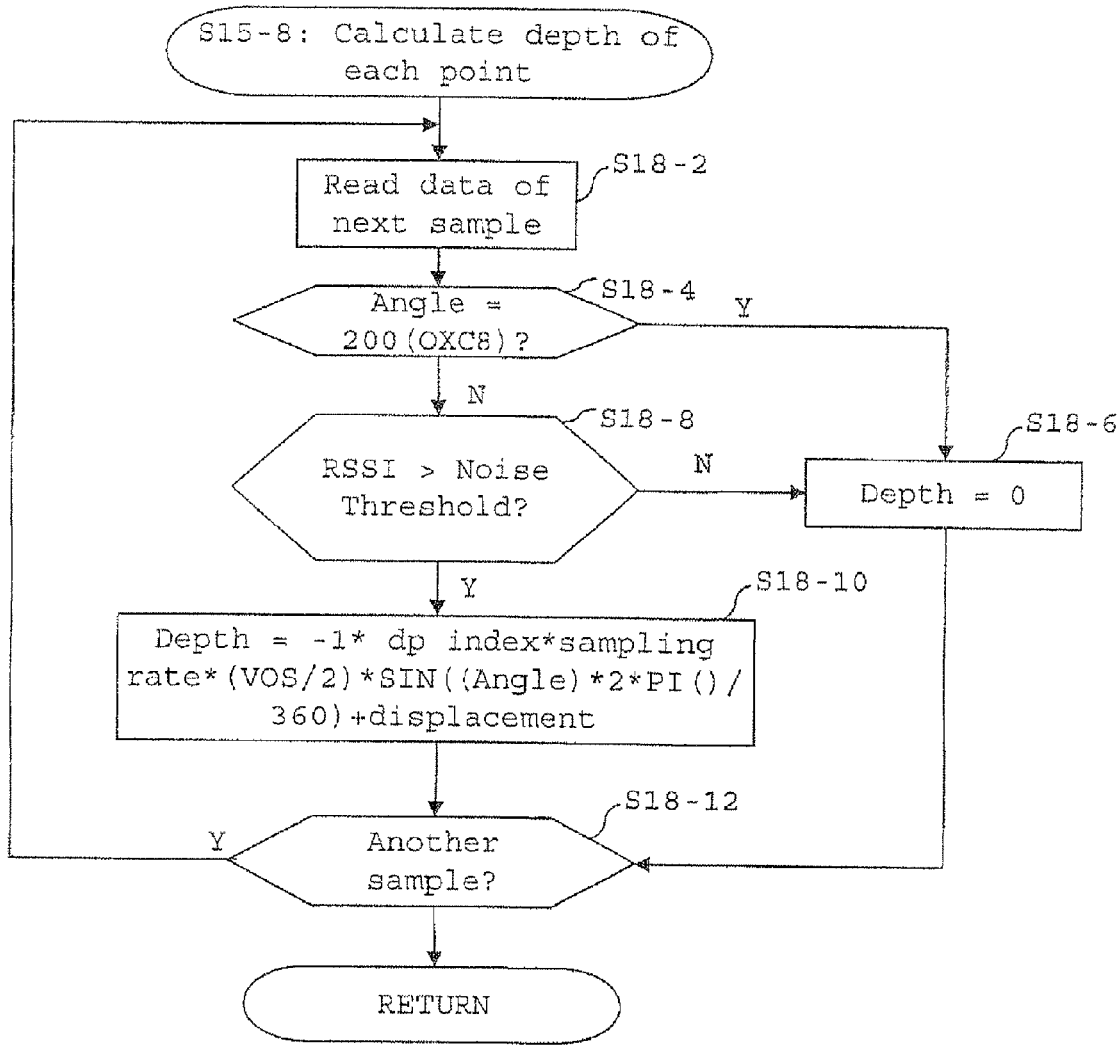
FIG. 18 is a flow chart showing the processing operations performed at step S15-8 in FIG. 15.

FIG. 18 shows the processing operations performed by depth calculator 214 at step S15-8.

Referring to FIG. 18, at step S18-2, depth calculator 214 reads the data of the next sample in the segment (this being the first sample the first time step S18-2 is performed).

At step S18-4, depth calculator 214 determines whether the angle is equal to 200° (0xC8) indicating an invalid angle.

If it is determined at step S18-4 that the angle is equal to 200°, then processing proceeds to step S18-6, at which depth calculator 214 sets the depth of the point for the current sample to be equal to 0 m, indicating an invalid depth.

On the other hand, if it is determined at step S18-4 that the angle is not equal to 200°, then processing proceeds to step S18-8, at which depth calculator 214 determines whether the RSSI value for the current sample is greater than the noise threshold previously read at step S15-4. If it is determined that the RSSI value is not greater than the noise threshold, then processing proceeds to step S18-6, at which depth calculator 214 sets the depth of the point for the current sample to be equal to 0 m.

On the other hand, if it is determined at step S18-8 that the RSSI value is greater than the noise threshold, then processing proceeds to step S18-10, at which depth calculator 214 calculates the depth of the point in accordance with the following equation:

$$\text{depth} = -1 \times (dp \text{ index}) \times (\text{sampling rate}) \times (\text{VOS}/2) \times \sin((\text{Angle}) \times 2PI(\ )360) + \text{displacement} \quad \text{Equation 2}$$

where −1 is used because the surface of the water is considered to be the zero datum so that all depths have negative values, "dp index" is the position of the sample in the segment, "VOS" is the velocity of sound, "2PI( )/360" converts angular data in degrees into radians, and "displacement" is the depth of the transducer array below the water surface (this value being input by the user using keypad 12 during installation of the sonar apparatus on the boat 50).

At step S18-12, depth calculator 214 determines whether there is another sample in the current segment to be processed, and steps S18-2 to S18-12 are repeated until each sample has been processed in the way described above.

Referring again to FIG. 15, at step S15-10, depth filter 220 calculates an average depth for the current segment and also a variance value with a minimum value, which in the present embodiment is set to 0.7. These values are used in subsequent filtering operations.

Figure 19:
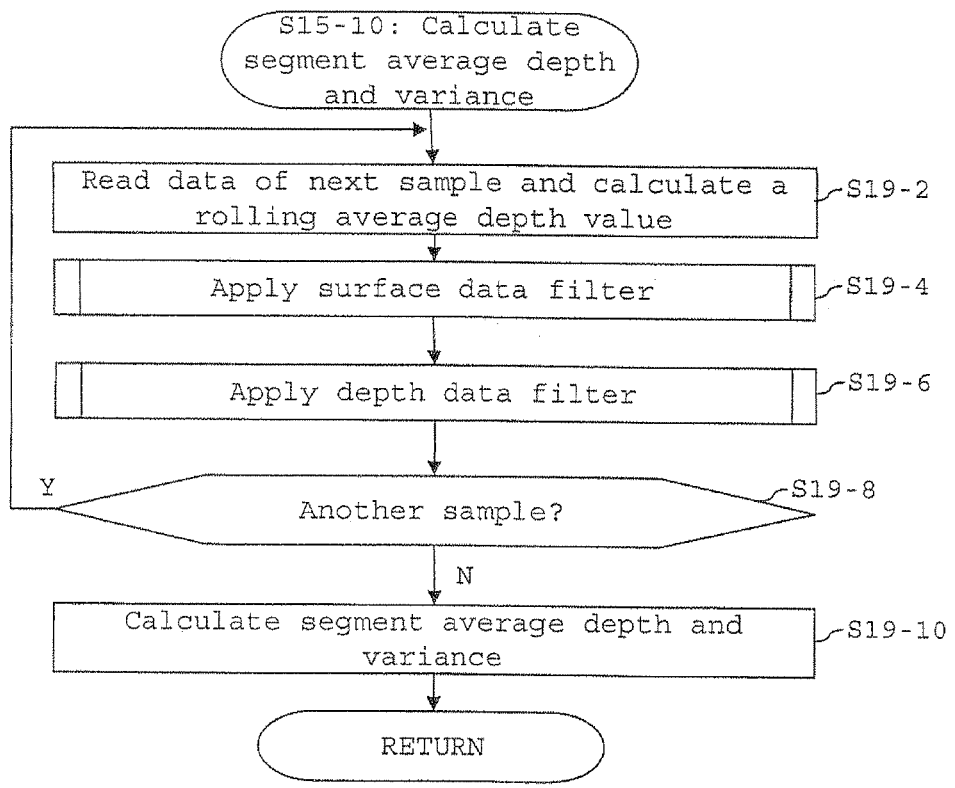
FIG. 19 is a flow chart showing the processing operations performed at step S15-10 in FIG. 15.

FIG. 19 shows the processing operations performed by depth filter 220 at step S15-10.

Referring to FIG. 19, at step S19-2, depth filter 220 reads the data of the next sample within the current segment (this being the first sample the first time step S19-2 is performed), and calculates a rolling average depth value of the sample. More particularly, depth filter 220 calculates the rolling average depth value by calculating the average depth of the current sample, the five samples preceding the current sample (if they exist) and the five samples following the current sample (if they exist).

At step S19-4, depth filter 220 performs surface filtering for the sample read at step S19-2.

Figure 20:
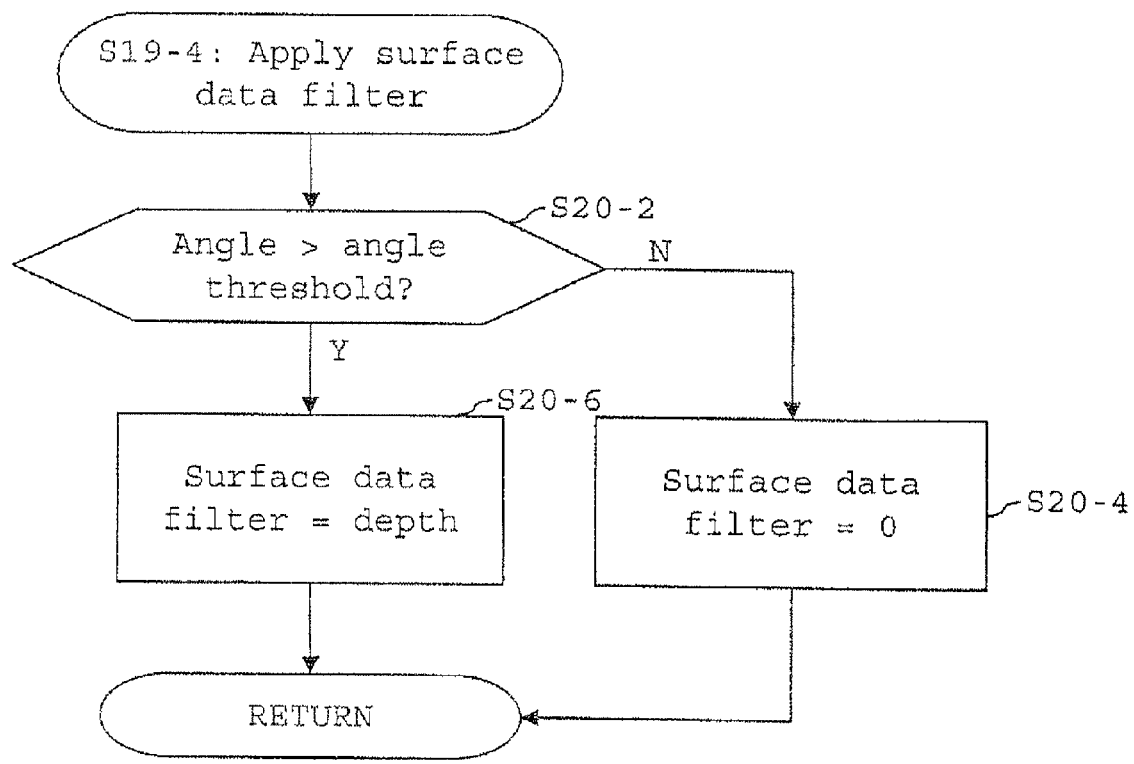
FIG. 20 is a flow chart showing the processing operations performed at step S19-4 in FIG. 19.

FIG. 20 shows the processing operations performed by depth filter 220 at step S19-4.

Referring to FIG. 20, at step S20-2, depth filter 220 determines whether the angle of the sample is greater than an angle threshold value which, in the present embodiment is set to 20°.

If it is determined at step S20-2 that the angle is not greater than the angle threshold, then processing proceeds to step S20-4, at which depth filter 220 sets the value of a variable "surface data filter" to be 0. On the other hand, if it is determined step S20-2 that the angle is greater than the angle threshold, then processing proceeds to step S20-6, at which depth filter 220 sets the value of the variable surface depth filter to be equal to the depth of the point previously calculated for the sample at step S15-8.

Referring again to FIG. 19, at step S19-6, depth filter 220 performs depth data filtering for the sample read at step S19-2.

Figure 21:
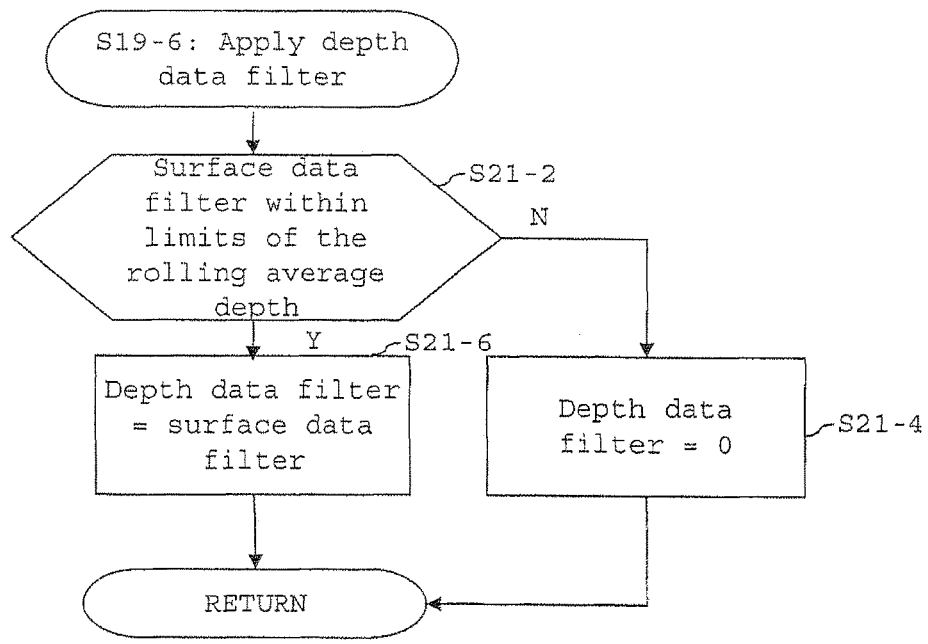
FIG. 21 is a flow chart showing the processing operations performed at step S19-6 in FIG. 19.

FIG. 21 shows the processing operations performed by depth filter 220 at step S19-6.

Referring to FIG. 21 at step S21-2, depth filter 220 determines whether the value of the variable surface data filter for the current sample is within acceptable limits of the rolling average depth that was calculated for the current sample at step S19-2. More particularly, in this embodiment, depth filter 220 determines whether the value of the variable surface data filter is within limits equal to the variance calculated at step S19-10 for the preceding sample (or set to the minimum 0.7 if there is no previous sample).

If it is determined at step S21-2 that the variable surface data filter does not have a value within the limits of the average depth, then processing proceeds to step S21-24, at depth filter 220 sets the value of a variable "depth data filter" to be 0. On the other hand, if it is determined at step S21-2 that the value of the variable surface data filter is within the limits of the average depth, then processing proceeds to step S21-6, at which depth filter 220 sets the value of the variable depth data filter to be equal to the value of the variable surface data filter.

Referring again to FIG. 19, at step S19-8, depth filter 220 214 determines whether another sample remains to be processed in the current segment, and steps S19-2 to S19-8 are repeated until each sample has been processed in the way described above.

At step S19-10, depth filter 220 calculates an average depth for the current segment by calculating the average of all non-zero values of the variable depth data filter.

Referring again to FIG. 15, at step S15-12, amplitude compensator 208 calculates compensated RSSI values for the samples in the current segment.

Figure 22:
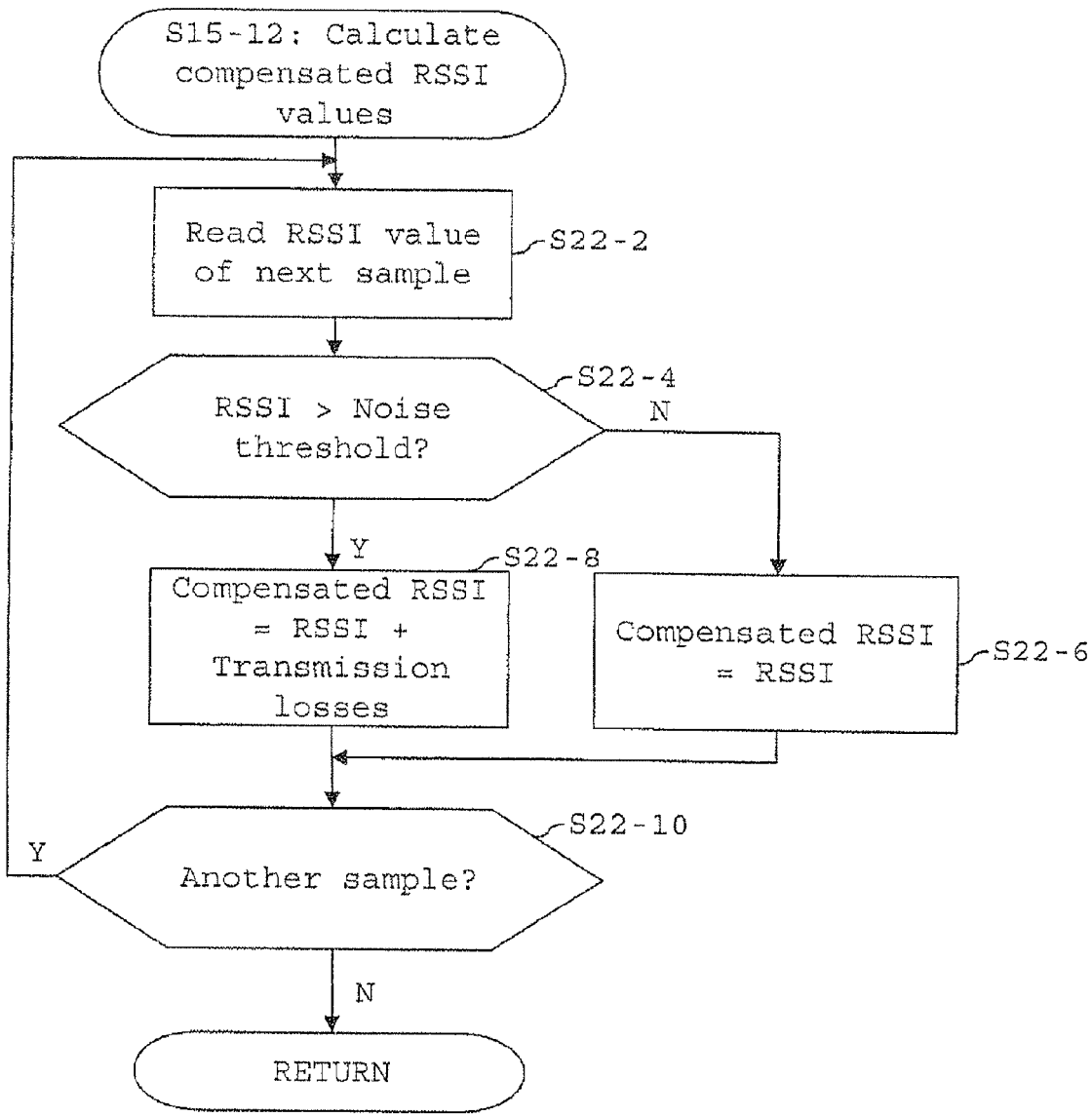
FIG. 22 is a flow chart showing the processing operations performed at step S15-12 in FIG. 15.

FIG. 22 shows the processing operations performed by amplitude compensator 208 at step S15-12.

Referring to FIG. 22, at step S22-2, amplitude compensator 208 reads the RSSI value of the next sample in the current segment (this being the first sample the first time step S22-2 is performed), and at step S22-4 determines whether the RSSI value is greater than the noise threshold previously read at step S15-4.

If it is determined at step S22-4 that the RSSI value is not greater than the noise threshold, then processing proceeds to step S22-6, at which amplitude compensator 208 replaces the RSSI value of the sample with a compensated RSSI value that is equal to the original RSSI value read at step S22-2 (thereby making no change to the RSSI value). On the other hand, if it is determined at step S22-4 that the RSSI value is greater than the noise threshold, then processing proceeds to step S22-8, at which amplitude compensator 208 replaces the RSSI value of the sample with a compensated RSSI value which is equal to the original RSSI value read at step S22-2 plus transmission losses. These transmission losses are calculated by amplitude compensator 208 in a conventional way taking into account the range of the reflecting pulse, for example as described in Fundamentals of Acoustics by L. E. Kinsler, A. R. Frey, A. B. Coppens and J. V. Sanders, ISBN, 0-471-02933-5, pages 397-399.

At step S22-10, amplitude compensator 208 determines whether another sample in the current segment remains to be processed, and steps S22-2 to S22-10 are repeated until each sample has been processed in the way described above.

Referring again to FIG. 15, at step S15-14, angle filter 222 processes the data of each sample to filter the reflecting points on the underwater floor based upon the angle of the points.

Figure 23:
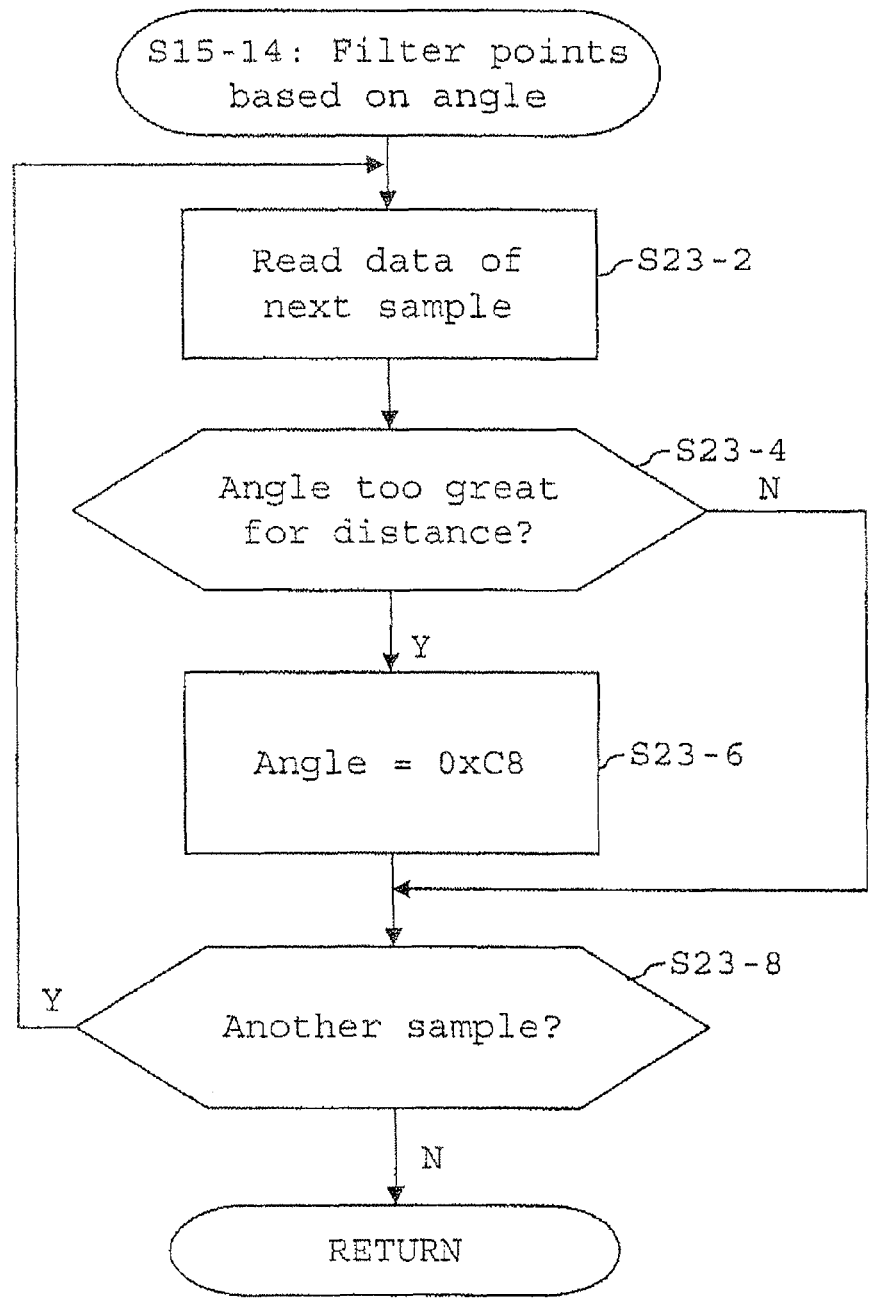
FIG. 23 is a flow chart showing the processing operations performed at step S15-14 in FIG. 15.

FIG. 23 shows the processing operations performed by angle filter 222 at step S15-14.

Referring to FIG. 23 at step S23-2, angle filter 222 reads the data of the next sample for the current segment (this being the first sample the first time step S22-2 is performed) and at step S23-4 determines whether the angle is too great for the distance.

If it is determined at step S23-4 that the angle is too great for the distance, then processing proceeds to step S23-6, at which angle filter 222 sets the angle to be 0×C8 (that is, 200°). On the other hand, if it is determined at step S23-4 that the angle is not too great for the distance, then the processing at step S23-6 is omitted.

At step S23-8, angle filter 222 determines whether any samples for the current segment remain to be processed, and steps S25-2 to S25-8 are repeated until all samples have been processed in the way described above.

Referring again to FIG. 15, at step S15-16, RSSI filter 224 processes each sample in the current segment to filter the reflecting points based upon RSSI values.

Figure 24:
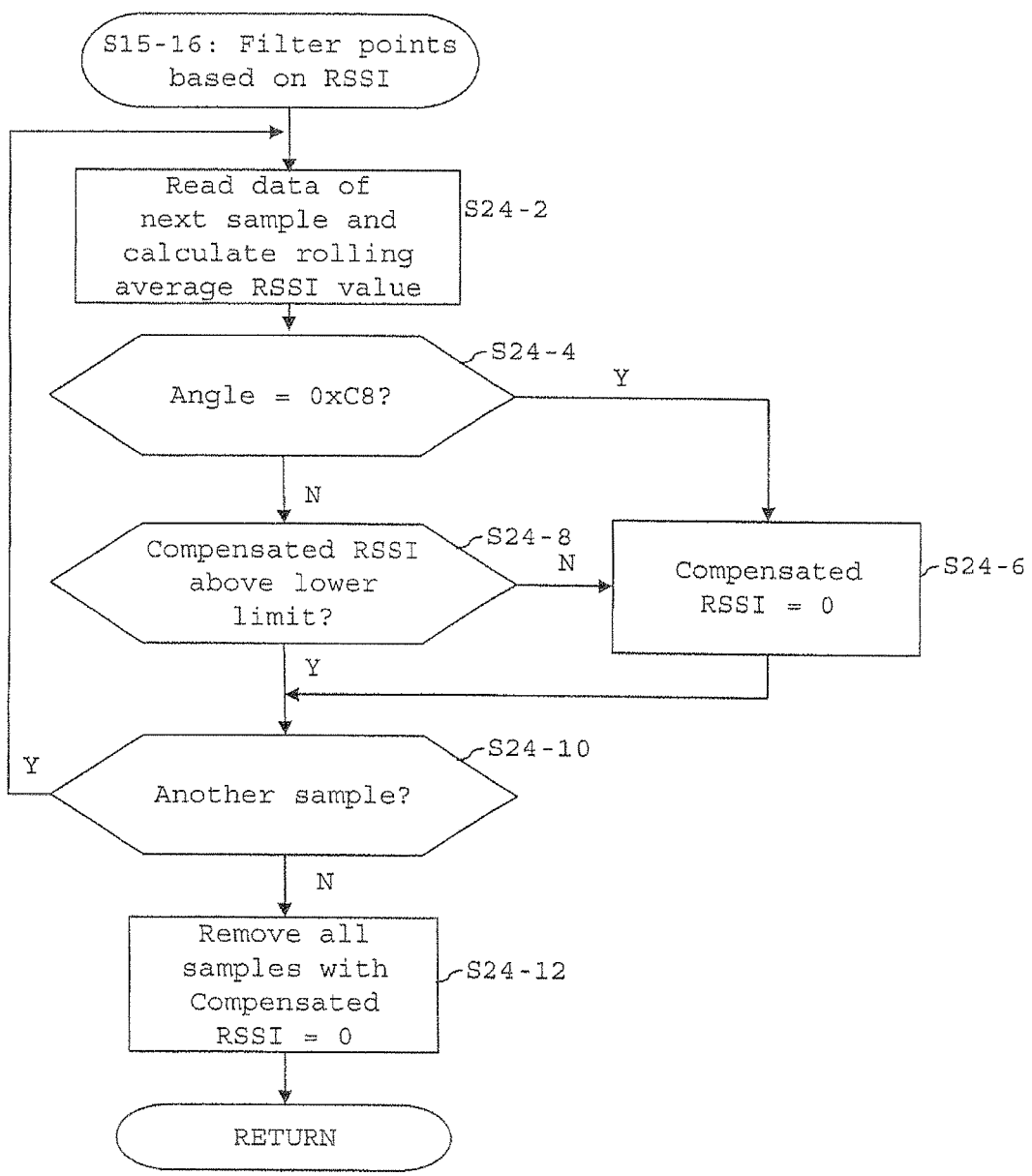
FIG. 24 is a flow chart showing the processing operations performed at step S15-16 in FIG. 15.

FIG. 24 shows the processing operations performed at step S15-16 by RSSI filter 224.

Referring to FIG. 24, at step S24-2, RSSI filter 224 reads the data of the next sample in the current segment (this being the first sample the first time step S24-2 is performed), and calculates a rolling average RSSI value for the sample. More particularly, RSSI filter 224 calculates the rolling average RSSI value by calculating the average RSSI of the current sample, the five samples preceding the current sample they exist) and the five samples following the current sample (if they exist).

At step S24-4 determines whether the angle for the sample is equal to 0×C8.

If it is determined at step S24-4 that the angle is equal to 0×C8, this indicates that the point is an invalid point, and processing proceeds to step S24-6, at which RSSI filter 224 replaces the compensated RSSI value of the sample with a compensated RSSI value equal to 0.

On the other hand, if it is determined at step S24-4 that the angle is not equal to 0×C8, then processing proceeds to step S24-8, at which RSSI filter 224 determines whether the compensated RSSI value read at step S24-2 is above a lower limit. In this embodiment, the lower limit is set to 6 dB below the rolling average RSSI calculated for the current sample at step S24-2.

If it is determined at step S24-8 that the compensated RSSI value is not above the lower limit, then processing proceeds to step S24-6, at which RSSI filter 224 replaces the compensated RSSI value with a compensated RSSI value equal to 0. On the other hand, if it is determined at step S24-8 that the compensated RSSI value is above the lower limit, then processing proceeds to step S24-10, at which RSSI filter 224 determines whether another sample in the current segment remains to be processed. Steps S24-2 to S24-10 are repeated until all samples in the current segment have been processed in the way described above.

At step S24-12, RSSI filter 224 removes all samples having a compensated RSSI value equal to 0.

Referring again to FIG. 15, at step S15-18, depth filter 220 processes the points remaining in the sample to filter the points based upon depth.

Figure 25:
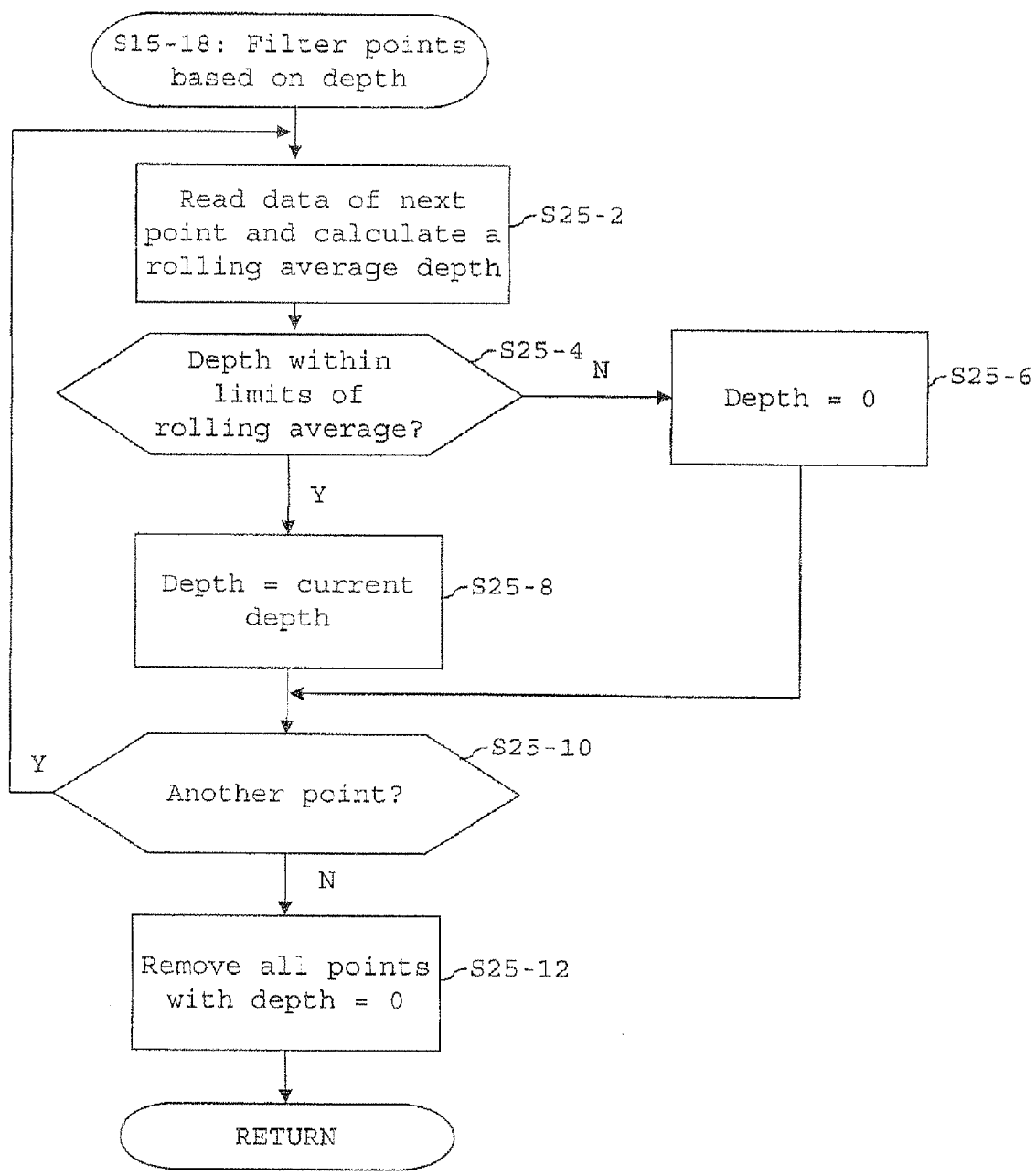
FIG. 25 is a flow chart showing the processing operations performed at step S15-18 in FIG. 15.

FIG. 25 shows the processing operations performed by depth filter 220 at step S15-18.

Referring to FIG. 25, at step S25-2, depth filter 220 reads the data of the next point in the current segment (this being the first point the first time step S25-2 is performed), and calculates a rolling average depth value for the point. More particularly, depth filter 220 calculates the rolling average depth value by calculating the average depth of the current point, the five points preceeding the current point (if they exist) and the five points following the current point (if they exist).

At step S25-4 determines whether the depth of the current point lies within predetermined limits of the rolling average depth calculated at step S25-2. In the present embodiment, the predetermined limits are set to the variance value, previously calculated at step S15-10.

If it is determined at step S25-4 that the depth is not within the predetermined limits, then processing proceeds to step S25-6, at which depth filter 220 sets the depth of the point to be 0 m. On the other hand, if it is determined at step S25-4 that the depth is within the predetermined limits, then processing proceeds to step S25-8, at which depth filter 220 retains the current depth as the depth of the point.

At step S25-10, depth filter 220 determines whether another point remains to be processed in the current segment, and steps S25-2 to S25-10 are repeated until all points in the segment have been processed in the way described above.

At step S25-12, depth filter 220 removes all points having a depth equal to 0 m.

Referring again to FIG. 15, at step S15-20, 3D position calculator 216 processes the data for the points remaining in the current segment to calculate coordinates defining a respective three-dimensional position for each point relative to the center line 20.

Figure 26:
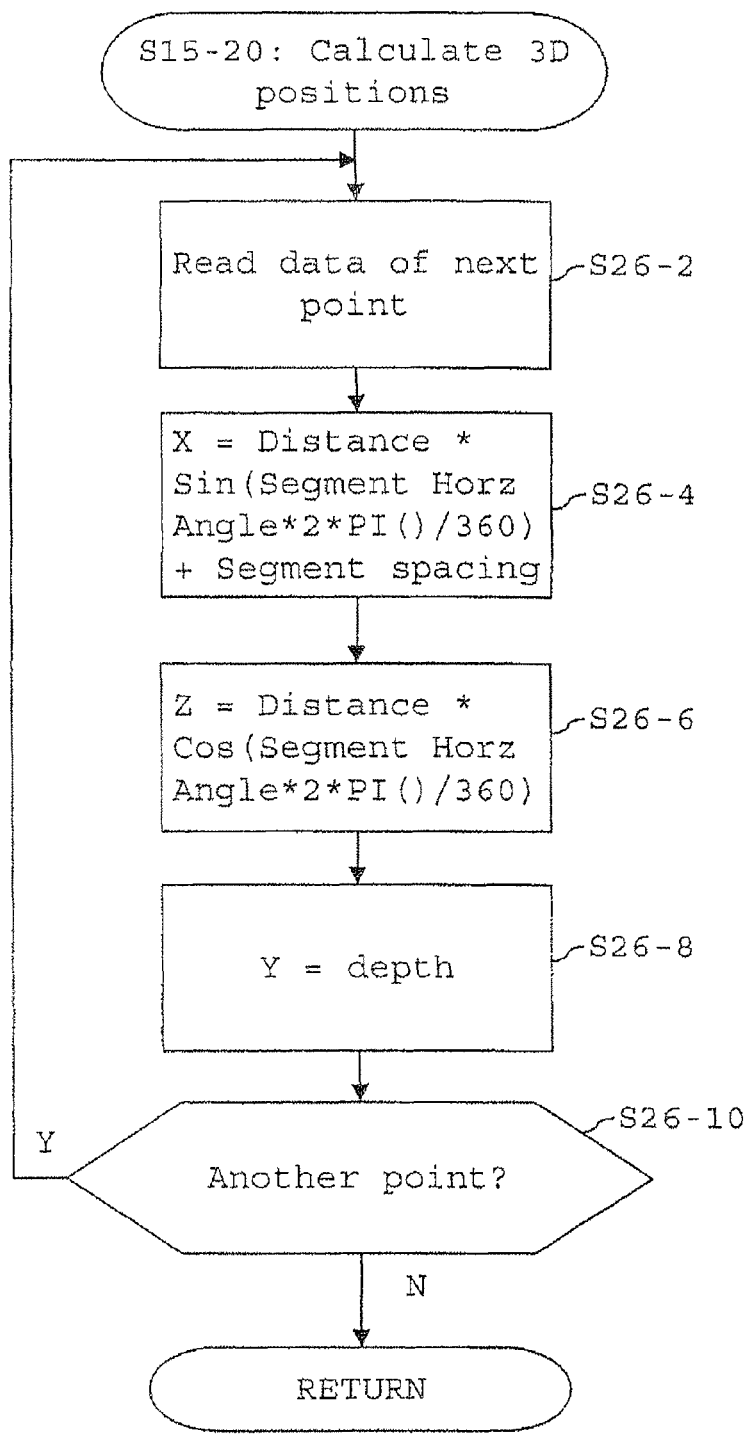
FIG. 26 is a flow chart showing the processing operations performed at step S15-20 in FIG. 15.

FIG. 26 shows the processing operations performed by 3D position calculator 216 at step S15-20.

Referring to FIG. 26, at step S26-2, 3D position calculator 216 reads the data of the next point in the current segment (this being the first point the first time step S26-2 is performed).

At step S26-4, 3D position calculator 216 calculates the "X" coordinate of the point (representing the displacement of the point in a horizontal plane in a direction perpendicular to the centre line 20) using the following equation:

$$X = \text{distance} \times \text{SIN}(\text{segment horizontal angle} \times 2PI(\ )/360) + \text{segment spacing} \qquad \text{Equation 3}$$

where "distance" is the stored distance for the point, "segment horizontal angle" is the angle ±10° or ±30° to the centre line 20 of the boat 50 of the transducer array currently being processed, "2PI( )/360" converts angular data in degrees into radians, and "segment spacing" is the distance of the transducer array from the centre line 20 of the boat 50 along a line perpendicular to the centre line 20 (this distance being input being the user via keypad 12 during installation of the sonar apparatus).

At step S26-6, 3D position calculator 216 calculates the "Z" coordinate of the point (representing the displacement of the point in a horizontal plane in a direction parallel to the centre line 20) using the following equation:

$$Z = \text{distance} \times \text{COS}(\text{segment horizontal angle} \times 2PI(\ )/360) \qquad \text{Equation 4}$$

At step S26-8, 3D position calculator 216 sets the "Y" coordinate of the point (representing the displacement of the point in a vertical plane) to be equal to the depth value.

At step S26-10, 3D position calculator 216 determines whether another point in the current segment remains to be processed, and steps S26-2 to S26-10 are repeated until all points have been processed in the way described above.

Referring again to FIG. 15 at step S15-22, range filter 226 processes each point in the current segment and removes points if they have a position substantially beyond the range currently set for the sonar apparatus.

Figure 27:
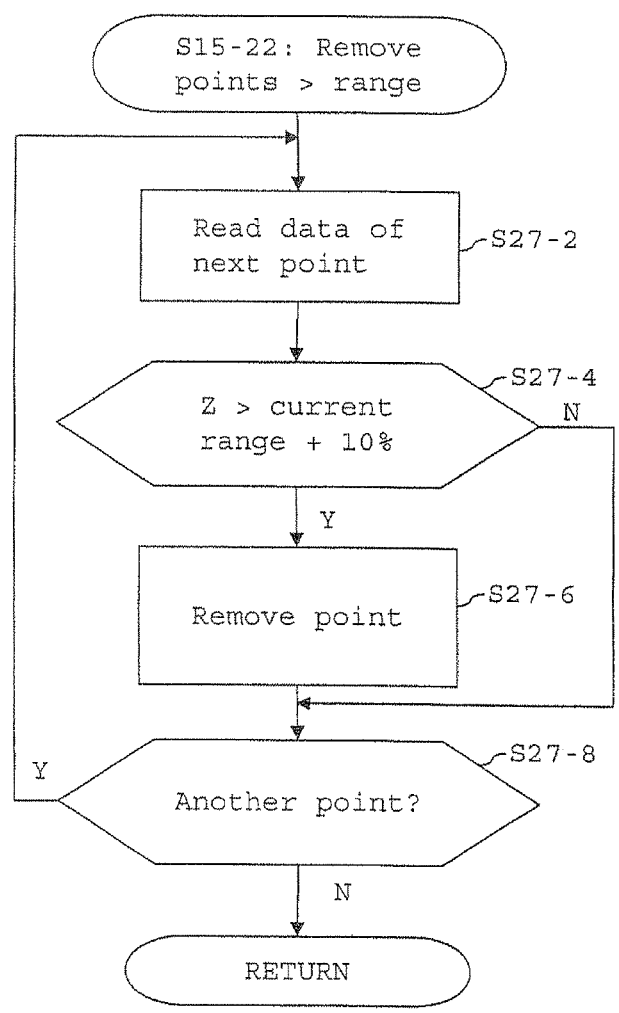
FIG. 27 is a flow chart showing the processing operations performed at step S15-22 in FIG. 15.

FIG. 27 shows the processing operations performed by range filter 226 at step S15-22.

Referring to FIG. 27, at step S27-2, range filter 226 reads the data of the next point in the current sample (this being the first point the first time step S27-2 is performed), and at step S27-4 determines whether the Z coordinate of the point is greater than 110% of the current range.

If it is determined at step S27-4 that the Z coordinate is greater than 110% of the current range, then processing proceeds to step S27-6, at which range filter 226 removes the point. On the other hand, if it is determined at step S27-4 that the Z coordinate is not greater than 110% of the current range, then step S27-6 is omitted.

At step S27-8, range filter 226 determines whether another point remains to be processed for the current segment, and steps S27-2 to steps S27-8 are repeated until all points have been processed in the way described above.

Referring again to FIG. 15, as a result of the processing at steps S15-2 to S15-22 described above, visual processor 8 has generated data defining the three-dimensional positions (in terms of X, Y, Z coordinates) of points on the underwater floor which reflected sound waves to the transducer array of the current segment.

At step S15-24, central controller 202 determines whether a further segment remains to be processed in the current set of four segments, and steps S15-2 to S15-24 are repeated until the data of all four segments has been processed in the way described above.

Having generated three-dimensional position data for the reflecting points in each of the four segments of the set, processing proceeds to step S15-26, at which interpolator 230 performs processing to calculate three-dimensional coordinates defining points on the underwater floor in between the segments 12, 14, 16, 18 of the respective transducer arrays.

Figure 28:
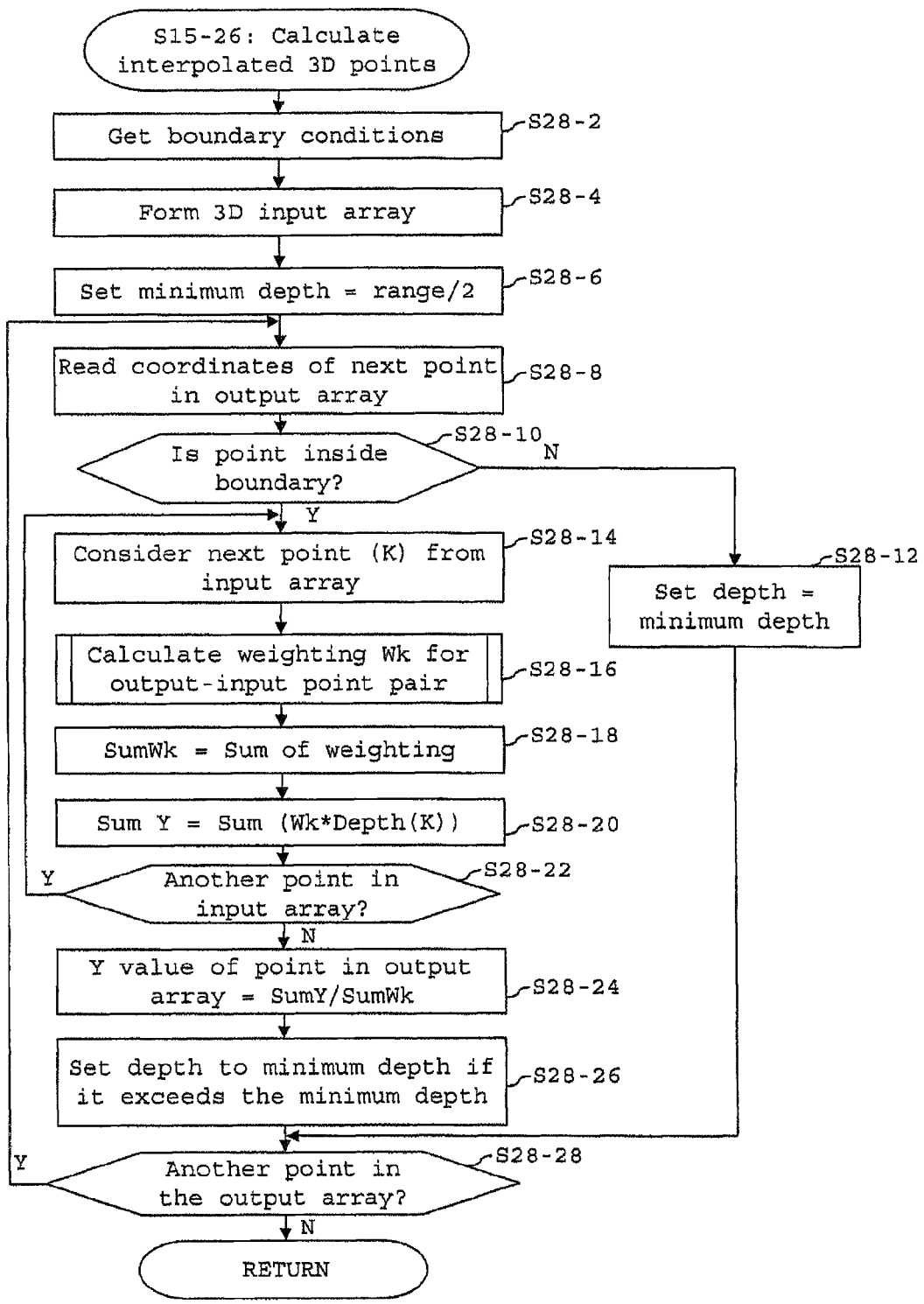
FIG. 28 is a flow chart showing the processing operations performed at step S15-26 in FIG. 15.

FIG. 28 shows the processing operations performed by interpolator 230 at step S15-26.

Referring to FIG. 28, at step S28-2, interpolator 230 reads data defining the boundary conditions for the display of the points, these boundary conditions comprising the current range of the sonar apparatus and the outer limits of the segment 12 and the segment 18.

At step S28-4, interpolator 230 forms a 3D input array of points. More particularly, interpolator 230 arranges all of the points resulting from steps S15-2 to S15-24 for all of the current four segments in a two-dimensional XZ array in dependence upon the X and Z coordinates of the points.

At step S28-6, interpolator 230 sets a minimum depth, which in this embodiment is set to be equal to half of the current range of the sonar apparatus, although different minimum depths could be set. A minimum depth is set (rather than a maximum depth) because each depth value is a negative number in this embodiment, as explained previously.

At step S28-8, interpolator 230 reads the XZ coordinates of the next point in an output array (this being the first point the first time step S28-8 is performed). The output array is a two-dimensional array of XZ points, each point initially having a Y value set to 0.

At step S28-10, interpolator 230 determines whether the point in the output array read at step S28-8 lies inside the boundary determined at step S28-2. If it is determined at step S28-10 that the point lies outside the boundary, then processing proceeds to step S28-12, at which interpolator 230 stores a Y value for the point in the output array which is equal to the minimum depth set at step S28-6, thereby ensuring that the point is not subsequently displayed.

On the other hand, if it is determined at step S28-10 that the current point in the output array is inside the boundary, then processing proceeds to step S28-14, at which interpolator 230 considers the next point "K" in the input array that was formed at step S28-4.

At step S28-16, interpolator 230 calculates a weighting value Wk for the pair of points comprising the current point in the output array read at step S28-8 and the current point in the input array read at step S28-14.

Figure 29:
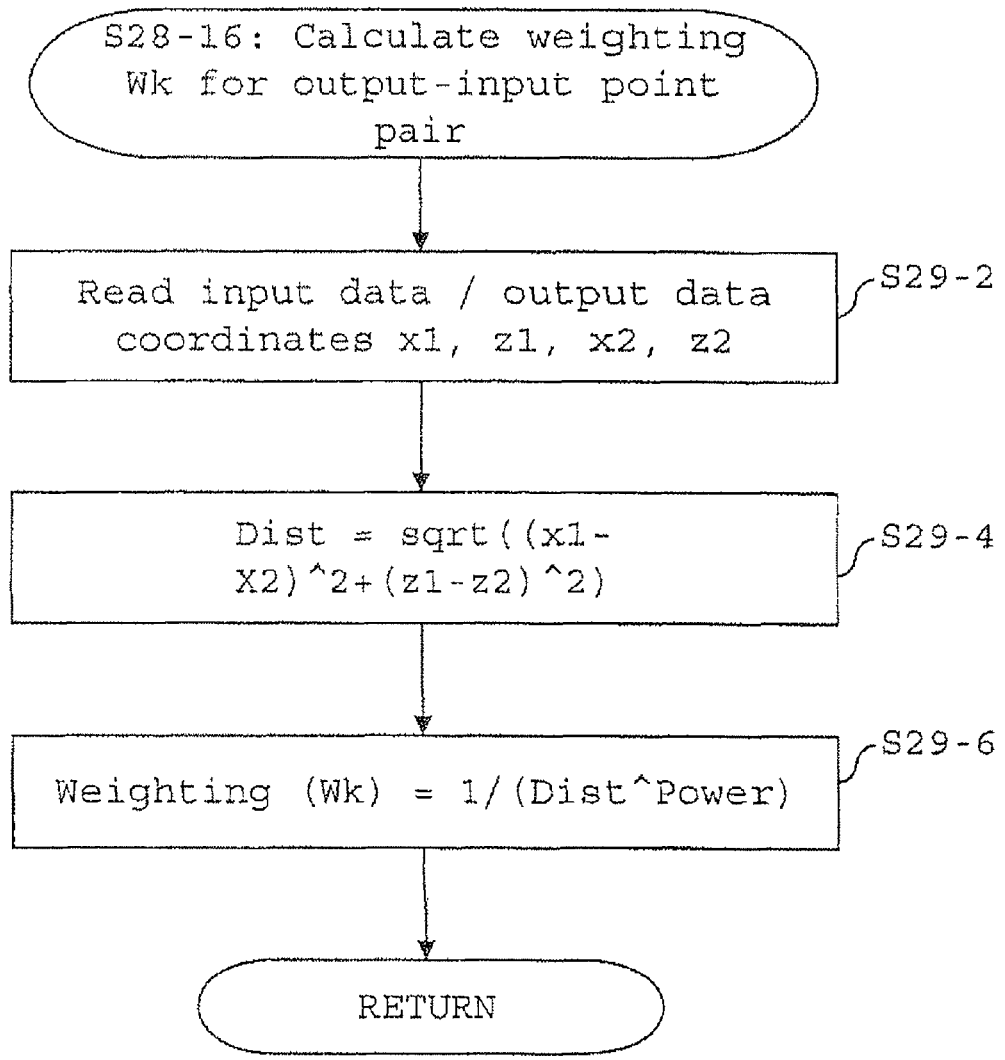
FIG. 29 is a flow chart showing the processing operations performed at step S28-16 in FIG. 28.
Figure 30:
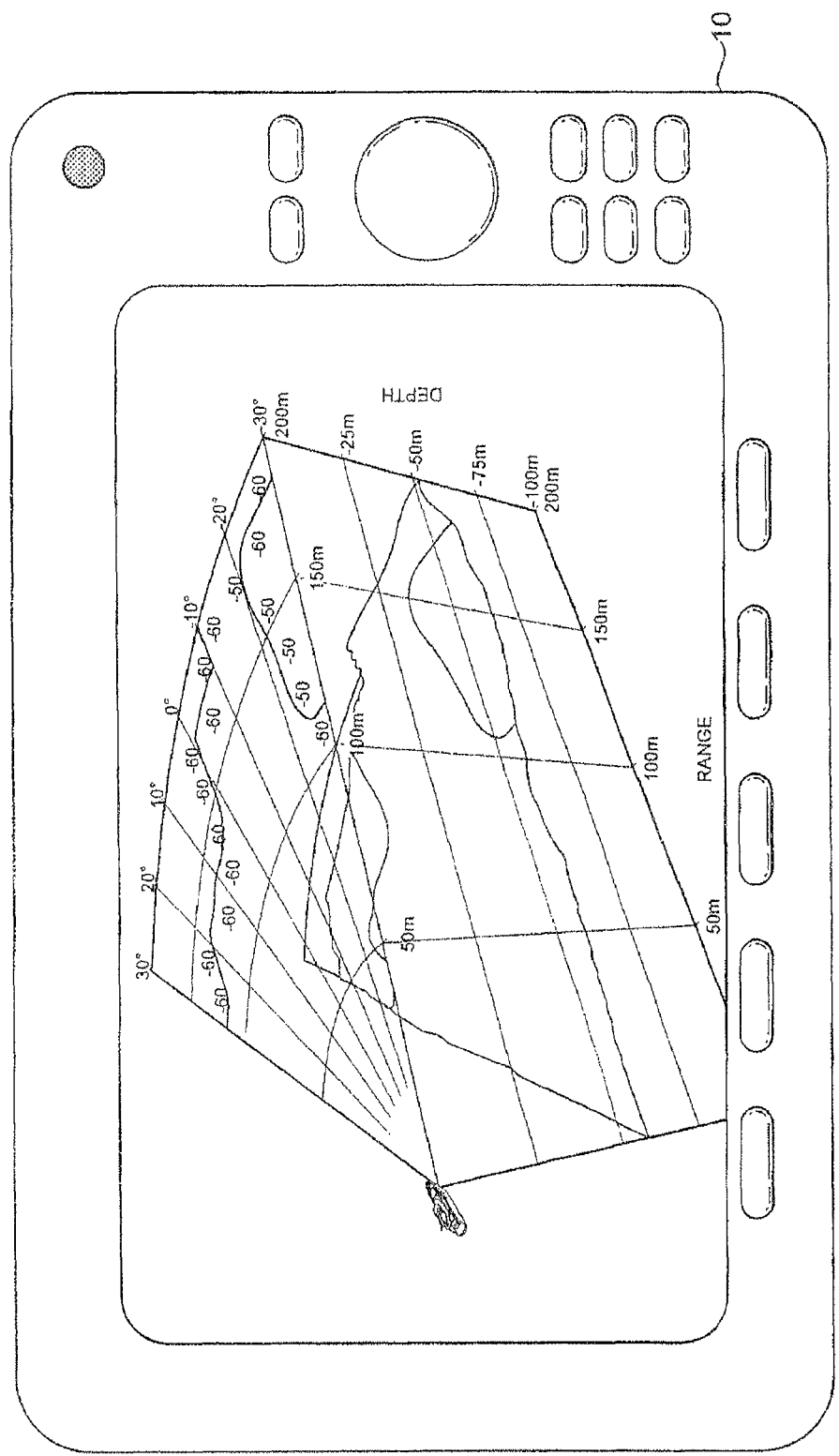
FIG. 30 shows an example of how the displayed data changes when the user adjusts the operating range of the sonar apparatus.

FIG. 29 shows the processing operations performed by interpolator 230 at step S28-16.

Referring to FIG. 29 at step S29-2, interpolator 230 reads the X1, Z1 coordinates of the point in the input array and the X2, Z2 coordinates of the point in the output array.

At step S29-4, interpolator 230 calculates the distance between the points in accordance with the equation:

$$\text{Distance} = \sqrt{(X1-X2)^2 + (Z1-Z2)^2} \qquad \text{Equation 5}$$

At step S29-6, interpolator 230 calculates the weighting Wk using the equation $$Wk = \frac{1}{\text{distance}^{power}} \qquad \text{Equation 6}$$

where "distance" is the distance calculated at step S29-4 and "power" is a constant whose value determines how smooth the interpolation is. The value of "power" has been determined empirically by the present inventor, and in this embodiment is set to 3.75.

Referring again to FIG. 28, at step S28-18, interpolator 230 increments the value of a variable "SumWk" for the current point in the output array by adding to the existing value (which is initially set to 0) the value of the weighting Wk calculated at step S30-16.

At step S30-20, interpolator 230 increments the value of a variable "SumY" for the current point in the output array by adding to the existing value (which is initially set to 0) a value equal to Wk×depth(K). In this way, the variable SumY for the current point in the output array is incremented by the depth of the current point in the input array multiplied by the weighting factor calculated for the pair of points at step S28-16.

At step S28-22, interpolator 230 determines whether there is another point in the input array to be processed, and steps S28-14 to S28-22 are repeated until each point in the input array has been processed in the way described above.

At step S28-24, interpolator 230 sets the Y value of the current point in the output array to be equal to $$Y = \frac{SumY}{SumWk} \qquad \text{Equation 7}$$

At step S28-26, interpolator 230 checks whether the Y value calculated at step S28-24 exceeds the minimum depth set at step S28-6, and sets the Y value to the minimum depth if the calculated Y value exceeds the minimum depth.

At step S28-28, interpolator 230 determines whether another point in the output array remains to be processed, and steps S28-8 to S28-28 are repeated until all points in the output array have been processed in the way described above.

Referring again to FIG. 15, the output array of 3D coordinates generated at step S15-26 is input to the display data generator at step S15-28, which renders the points defined by the three-dimensional coordinates in a conventional way to generate data for display on display 10. In this embodiment, the rendering is performed by display data generator to generate an image from a viewing direction specified by the user using keypad 12.

At step S15-30, the image data generated by display data generator 232 at step S15-28 is displayed on display 10, for example as shown in FIG. 2.

Figure 31:
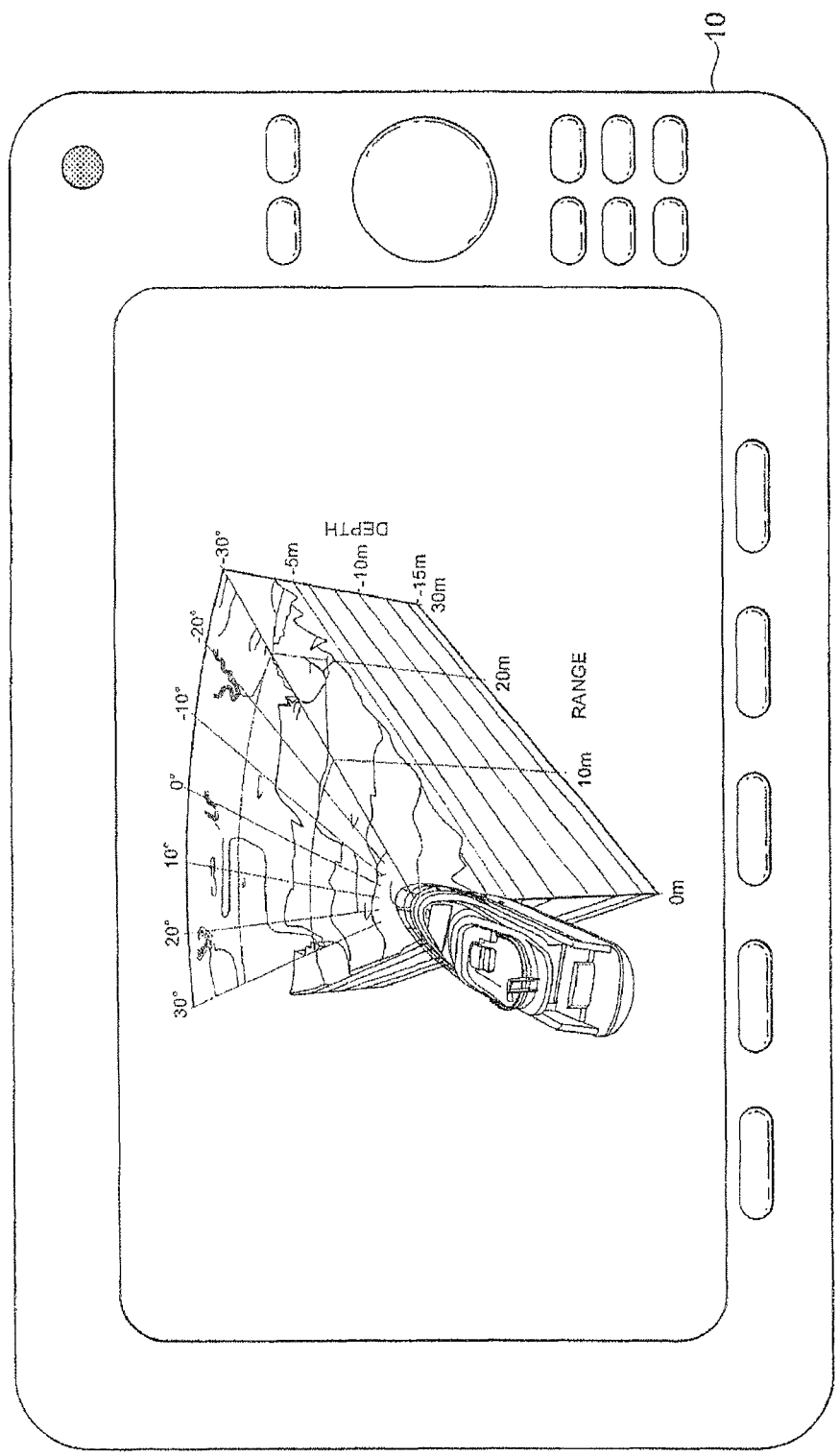
FIG. 31 shows a first example of how the displayed data changes when the user adjusts the viewing direction from which the three-dimensional points are rendered.
Figure 32:
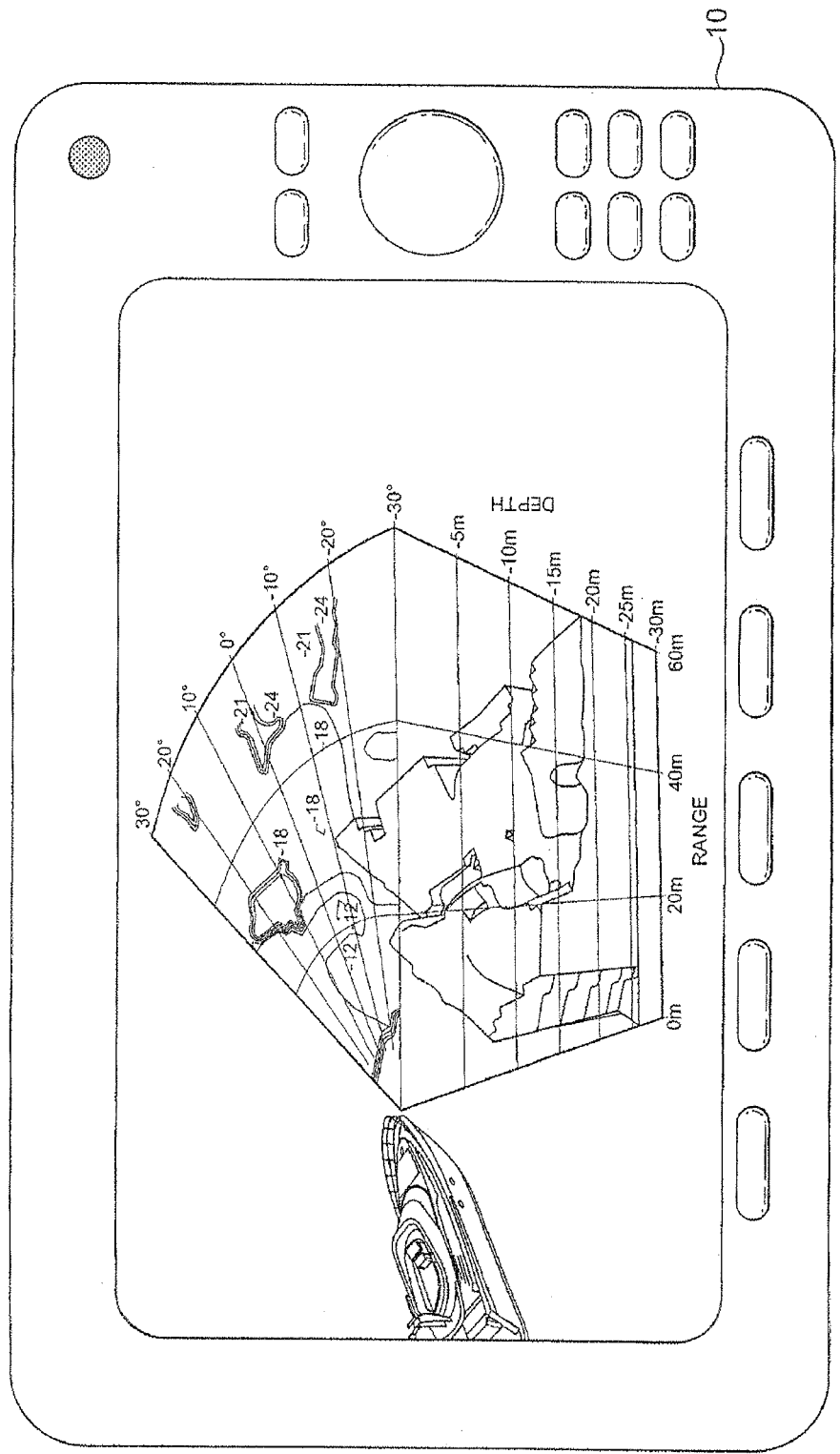
FIG. 32 shows a second example of how the displayed data changes when the user adjusts the viewing direction from which the three-dimensional points are rendered.

As noted previously, both the operating range of the sonar apparatus and the viewing direction from which images are generated can be changed by the user of the present embodiment. FIG. 32 shows an example of the display generated when the range is changed, while FIGS. 31 and 32 show examples of the display that is generated when the viewing angle is changed (as well as the range).

[Modifcations and Variations]

Many modifications and variations can be made to the embodiment described above.

For example, the dimensions and arrangement of the transmitting transducers T and/or receiving transducers R1, R2, R3 may be changed to transmit and/or receive sound waves in segments of different angular extent.

In the embodiment described above, each of the port and starboard transducer units 2, 4 includes two transducers arrays 30, 32. However, different numbers of transducer arrays may be provided. For example, each of the port and starboard transducer units 2,4 may include only a single transducer array or more than two transducer arrays.

Furthermore, instead of using two transducer units 2, 4, a different number of transducer units may be provided. For example, in addition to the port and starboard transducer units 2,4, a third transducer unit may be provided mounted on the centre line 20 of the boat. Each of these three transducer units may then contain a single transducer array or, alternatively, two or more transducer arrays.

In the embodiment described above, the transmitting transducer T is separate from the receiving transducers R1, R2 and R3 in each array. However, instead, a receiving transducer R1, R2, R3 may be operated in a dual mode within each array to act as a transmitting transducer as well.

In the described embodiment, each transducer array includes a transmitting transducer. However, instead, one transmitter may be provided for all of the transducer arrays. For example, a single transmitter may be mounted on the centre line 20 of the boat 50, and each of the transducer arrays in the port and starboard transducer units 2, 4 may be arranged to received reflected sound waves from this single transmitter. In this arrangement, all of the transducer arrays may be controlled so as to receive reflected sound waves at the same time.

In the described embodiment, the processing of the output signals from the receiving transducers is split between the transducer interface 6 and the visual processor 8. Different split's of this processing are possible. In addition all of the processing may be carried out in the transducer interface 6 or visual processor 8, so that only a single one of the units is necessary and it is not necessary to provide two separate units.

During the processing to calculate interpolated 3D points at step S15-26 in the described embodiment, interpolator 230 calculates weighting Wk in accordance with the distance between the input data and output data coordinates using equation 6. However, different equations may be used instead of equation 6.

Furthermore the described embodiment performs steps S28-14 to S28-22 during the interpolation processing so as to take into account every point K in the input array for each single point in the output array. However, instead, it is possible to restrict the points K from the input array that are taken into account by considering only points in the input array that are less than a predetermined distance from the point in the output array.

In the described embodiment, the depth of the transducer array below the water surface is taken into account at step S18-10 when the depth of each reflecting point is calculated by depth calculator 214, thereby ensuring that the depth of each reflecting point is calculated relative to the water surface. However, instead, the depth of the transducer array below the water surface may be taken into account at step S26-8 instead of step S18-10. Alternatively, the depth of the transducer array below the water surface can be ignored, so that the depth of each reflecting point is calculated relative to the transducer array.

In the described embodiment the processing at step S15-26 to calculate interpolated 3D points generates an output array of points which contain points with interpolated depth values both within the segments 12, 14, 16, 18 and between these segments. This output array of points replaces the input array of points so that the input array of points do not get rendered at step S15-28. However, instead, the input array of points may be retained and the processing at step S15-26 may be performed to calculate interpolated points only for positions in between the segments 12, 14, 16, 18. In this case, both the input array of points and the output array of points would then be rendered at step S15-28.

Many other modifications and variations are, of course, possible.

The invention claimed is:

1. Sonar apparatus for mounting on a boat, comprising:
   at least one transmitter operable to transmit sound waves for reflection from points on the underwater floor in front of the boat;
   a plurality of one-dimensional arrays of receiving transducers, comprising a respective array for each of a plurality of segments of water in front of the boat, each array of receiving transducers being responsive to received sound waves reflected from points on the underwater floor within the respective associated segment of water in front of the boat to produce electrical signals, wherein the one-dimensional arrays of receiving transducers are arranged in a plurality of housings configured to be mounted on the port and starboard sides of the boat, and wherein each housing contains at least two one-dimensional arrays of receiving transducers, with the arrays mounted at a predetermined angle relative to each other so as to receive reflected sound waves from different respective segments of the water in front of the boat that are separated from each other in a horizontal plane;
   a feature locator operable to process the electrical signals from each respective array of receiving transducers to calculate three-dimensional positions of reflecting points on the underwater floor within the segment of water associated with the array of receiving transducers;
   an interpolator operable to calculate from the three-dimensional positions of the reflecting points within the segments calculated by the feature locator, three-dimensional positions of points on the underwater floor in front of the boat between the segments; and
   a display data generator operable to process the three-dimensional positions of the points to generate image data for display showing the underwater floor in front of the boat.

2. Sonar apparatus according to claim 1, wherein:
   a plurality of transmitters are provided, each transmitter being arranged in a respective array of receiving transducers; and
   the sonar apparatus is arranged to control each array such that the operational time of the array, comprising the time during which the transmitter in the array transmits sound waves and the time during which the receiving transducers in the array receive reflected sound waves, does not overlap with the operational time of any of the other arrays.

3. Sonar apparatus according to claim 1, wherein the segments of water associated with the arrays of receiving transducers are equally angularly spaced in a horizontal plane.

4. Sonar apparatus according to claim 1, wherein the feature locator is operable to process the electrical signals from each respective array of receiving transducers to calculate the three-dimensional positions of each reflecting point in the segment of water associated with the transducer array by:
   calculating an angle of the reflecting point relative to the array of receiving transducers in dependence upon relative phases of the electrical signals produced by receiving transducers in the array;
   calculating the distance of the reflecting point from the transducer array in a horizontal plane in dependence upon the calculated angle;
   calculating the depth of the reflecting point in a vertical plane in dependence upon the calculated angle; and
   calculating coordinates defining the three-dimensional position of the reflecting point relative to the boat in dependence upon the calculated distance and depth.

5. Sonar apparatus according to claim 1, wherein the interpolator is arranged to calculate a depth of each said point in front of the boat between the segments by calculating a weighted sum of the depths of a plurality of reflecting points on the underwater floor within at least two of the segments of water in front of the boat.

6. Sonar apparatus according to claim 5, wherein the interpolator is operable to calculate, for each said point between the segments, a respective weighting factor for each reflecting point within the at least two segments that is to contribute to the depth of the point between the segments, and is operable to calculate the depth of the point between the segments by calculating the weighted sum of the depths and dividing the weighted sum of the depths by a sum of the weighting factors.

7. Sonar apparatus for mounting on a boat, comprising:
at least one transmitter operable to transmit sound waves for reflection from points on the underwater floor in front of the boat;
a plurality of arrays of receiving transducers, comprising a respective array for each of a plurality of segments of water in front of the boat, each array of receiving transducers being responsive to received sound waves reflected from points on the underwater floor within the respective associated segment of water in front of the boat to produce electrical signals;
a feature locator operable to process the electrical signals from each respective array of receiving transducers to calculate three-dimensional positions of reflecting points on the underwater floor within the segment of water associated with the array of receiving transducers;
an interpolator operable to calculate from the three-dimensional positions of the reflecting points within the segments calculated by the feature locator, three-dimensional positions of points on the underwater floor in front of the boat between the segments; and
a display data generator operable to process the three-dimensional positions of the points to generate image data for display showing the underwater floor in front of the boat;
wherein the interpolator is arranged to calculate a depth of each said point in front of the boat between the segments by calculating a weighted sum of the depths of a plurality of reflecting points on the underwater floor within at least two of the segments of water in front of the boat; and
wherein the interpolator is arranged to calculate a weighting factor for each reflecting point that is to contribute to the depth of the point between the segments as $$\text{weighting factor} = \frac{1}{d^p}$$

where "d" is the distance between the point between the segments and the reflecting point within a segment, and "p" is a constant.

8. Sonar apparatus according to claim 1, wherein the display data generator is operable to generate the image data for display showing the underwater floor in front of the boat from a plurality of different viewing directions.

9. A method of locating points on an underwater floor in front of a boat and generating image data for display showing the underwater floor, the method comprising:
transmitting sound waves from at least one transmitter for reflection from points on the underwater floor in front of the boat;
receiving sound waves reflected from points on the underwater floor within different respective segments of water in front of the boat and converting the received sound waves to electrical signals for each of the segments of water, the receiving and converting being performed by a plurality of one-dimensional arrays of receiving transducers, comprising a respective array for each of the plurality of segments of water in front of the boat, wherein the one-dimensional arrays of receiving transducers are arranged in a plurality of housings, at least one housing being mounted on the port side of the boat and at least one housing being mounted on the starboard side of the boat, and wherein each housing contains at least two one-dimensional arrays of receiving transducers mounted at a predetermined angle relative to each other so as to receive sound waves from different respective segments of water in front of the boat that are separated from each other in a horizontal plane;
processing the electrical signals from each respective segment of water to calculate three-dimensional positions of reflecting points on the underwater floor within the segment of water;
calculating from the calculated three-dimensional positions of the reflecting points within the segments, three-dimensional positions of points on the underwater floor in front of the boat between the segments; and
processing the three-dimensional positions of the points to generate image data for display showing the underwater floor in front of the boat.

10. A method according to claim 9, wherein:
the sound waves are transmitted from a plurality of transmitters;
each transmitter is arranged in a respective array of the receiving transducers; and
each array is controlled such that the operational time of the array, comprising the time during which the transmitter in the array transmits sound waves and the time during which the receiving transducers in the array receive reflected sound waves, does not overlap with the operational time of any of the other arrays.

11. A method according to claim 9, wherein the segments of water from which the reflected sound waves are received are equally angularly spaced in a horizontal plane.

12. A method according to claim 9, wherein the electrical signals for each respective segment of water are processed to calculate the three-dimensional position of each reflecting point on the underwater floor within the segment of water by:
calculating an angle of the reflecting point relative to a receiver in dependence upon relative phases of the electrical signals;
calculating the distance of the reflecting point from the receiver in a horizontal plane in dependence upon the calculated angle;
calculating the depth of the reflecting point in a vertical plane in dependence upon the calculated angle; and
calculating coordinates defining the three-dimensional position of the reflecting point relative to the boat in dependence upon the calculated distance and depth.

13. A method according to claim 9, wherein a depth of each said point in front of the boat between the segments is calculated by calculating a weighted sum of the depths of a plurality of reflecting points on the underwater floor within at least two of the segments of water in front of the boat.

14. A method according to claim 13, wherein, for each said point between the segments, a respective weighting factor is calculated for each reflecting point within the at least two segments that is to contribute to the depths of the point between the segments, and the depth of the point between the segments is calculated by calculating the weighted sum of the depths and dividing the weighted sum of the depths by a sum of the weighting factors.

15. A method of locating points on an underwater floor in front of a boat and generating image data for display showing the underwater floor, the method comprising:
transmitting sound waves for reflection from points on the underwater floor in front of the boat;
receiving sound waves reflected from points on the underwater floor within different respective segments of water in front of the boat and converting the received sound waves to electrical signals for each of the segments of water;

processing the electrical signals from each respective segment of water to calculate three-dimensional positions of reflecting points on the underwater floor within the segment of water;

calculating from the calculated three-dimensional positions of the reflecting points within the segments, three-dimensional positions of points on the underwater floor in front of the boat between the segments; and processing the three-dimensional positions of the points to generate image data for display showing the underwater floor in front of the boat;

wherein a depth of each said point in front of the boat between the segments is calculated by calculating a weighted sum of the depths of a plurality of reflecting points on the underwater floor within at least two of the segments of water in front of the boat; and wherein a weighting factor is calculated for each reflecting point used in the weighted sum as $$\text{weighting factor} = \frac{1}{d^p}$$

where "d" is the distance between the point between the segments and the reflecting point within a segment, and "p" is a constant.

16. A method according to claim 9, wherein the image data for display showing the underwater floor in front of the boat is generated from a plurality of different viewing directions.

* * * * *